United States Patent
Nam et al.

(10) Patent No.: US 12,464,553 B2
(45) Date of Patent: Nov. 4, 2025

(54) ELECTRONIC DEVICE REQUESTING RESOURCE FOR UPLINK, NETWORK ALLOCATING REQUESTING RESOURCE FOR UPLINK AND METHOD FOR OPERATING THEREOF

(71) Applicant: SAMSUNG ELECTRONICS CO., LTD., Suwon-si (KR)

(72) Inventors: Yujin Nam, Suwon-si (KR); Kyungrae Kim, Suwon-si (KR); Haksung Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 401 days.

(21) Appl. No.: 18/070,956

(22) Filed: Nov. 29, 2022

(65) Prior Publication Data

US 2023/0171801 A1   Jun. 1, 2023

Related U.S. Application Data

(63) Continuation of application No. PCT/KR2022/018328, filed on Nov. 18, 2022.

(30) Foreign Application Priority Data

Nov. 29, 2021  (KR) .................. 10-2021-0167719
Jan. 3, 2022    (KR) .................. 10-2022-0000535

(51) Int. Cl.
  *H04W 72/12*   (2023.01)
  *H04W 72/23*   (2023.01)
  *H04W 72/542*  (2023.01)

(52) U.S. Cl.
  CPC ......... *H04W 72/542* (2023.01); *H04W 72/23* (2023.01)

(58) Field of Classification Search
  CPC ....... H04L 5/14; H04L 5/0044; H04L 5/0094; H04L 5/1461; H04L 1/0009;
  (Continued)

(56) References Cited

U.S. PATENT DOCUMENTS 10,757,722 B2 *  8/2020  Kim ................ H04W 72/1263
10,887,907 B2 *  1/2021  Byun ................. H04W 72/23
(Continued)

FOREIGN PATENT DOCUMENTS

CN         110557839        12/2019
KR      10-2014-0002091      1/2014
(Continued)

OTHER PUBLICATIONS

Extended European Search Report dated Nov. 19, 2024 issued in European Patent Application No. 22898958.8.
(Continued)

*Primary Examiner* — Jung Liu
(74) *Attorney, Agent, or Firm* — NIXON & VANDERHYE P.C.

(57) ABSTRACT

According to various embodiments, a method of operating a network may include: identifying a scheduling request message from an electronic device through at least one first resource, and the at least one first resource may include at least a portion of physical uplink control channel (PUCCH) resources allocated to the electronic device; identifying a reception intensity of the scheduling request message in the at least one first resource; identifying at least one second resource allocated to the electronic device, based on the reception intensity, wherein the at least one second resource may be allocated for a PUSCH of the electronic; and transmitting downlink control information (DCI) including information for identifying the at least one second resource to the electronic device.

20 Claims, 17 Drawing Sheets

(58) Field of Classification Search
CPC .... H04L 5/0053; H04L 1/0003; H04W 72/23; H04W 72/0446; H04W 72/232; H04W 72/51; H04W 72/21; H04W 72/1268
See application file for complete search history.

(56) References Cited

U.S. PATENT DOCUMENTS

| | | | | |
|---|---|---|---|---|
| 11,121,744 | B2 * | 9/2021 | Park | H04L 5/001 |
| 11,129,151 | B2 * | 9/2021 | Park | H04L 1/1671 |
| 11,160,106 | B2 * | 10/2021 | Lee | H04W 72/0446 |
| 11,664,853 | B2 * | 5/2023 | Park | H04L 5/001 370/328 |
| 2013/0035132 | A1 | 2/2013 | Shin et al. | |
| 2014/0086182 | A1 * | 3/2014 | Shin | H04W 52/146 370/329 |
| 2015/0373678 | A1 | 12/2015 | Chou et al. | |
| 2017/0202009 | A1 | 7/2017 | Kim et al. | |
| 2018/0242291 | A1 | 8/2018 | Moon et al. | |
| 2018/0278383 | A1 | 9/2018 | Kim et al. | |
| 2018/0279359 | A1 | 9/2018 | Liu et al. | |
| 2019/0104538 | A1 | 4/2019 | Kim et al. | |
| 2019/0116608 | A1 * | 4/2019 | Kim | H04W 72/1263 |
| 2019/0239244 | A1 | 8/2019 | Yang et al. | |
| 2019/0349962 | A1 | 11/2019 | Kim et al. | |
| 2020/0037353 | A1 * | 1/2020 | Lee | H04L 1/18 |
| 2020/0059949 | A1 * | 2/2020 | Byun | H04W 72/23 |
| 2020/0120704 | A1 | 4/2020 | Wang et al. | |
| 2020/0137695 | A1 | 4/2020 | Papasakellariou | |
| 2020/0220672 | A1 * | 7/2020 | Kim | H04L 5/001 |
| 2021/0176718 | A1 * | 6/2021 | Liu | H04W 52/362 |
| 2021/0399769 | A1 * | 12/2021 | Park | H04L 5/005 |
| 2022/0312502 | A1 * | 9/2022 | Kim | H04W 74/0866 |
| 2023/0065090 | A1 * | 3/2023 | Kim | H04L 5/14 |

FOREIGN PATENT DOCUMENTS

| | | |
|---|---|---|
| KR | 10-2018-0116476 | 10/2018 |
| WO | 2021/127959 | 7/2021 |

OTHER PUBLICATIONS

Search Report and Written Opinion dated Feb. 23, 2023 issued in International Patent Application No. PCT/KR2022/018328.
3GPP E-Meeting Notes, "Further Discussion on XR Evaluation Methodology", 3GPP TSG RAN WG1 Meeting #150e Notes, May 12, 2021, 6 pages.

* cited by examiner

ELECTRONIC DEVICE REQUESTING RESOURCE FOR UPLINK, NETWORK ALLOCATING REQUESTING RESOURCE FOR UPLINK AND METHOD FOR OPERATING THEREOF

CROSS-REFERENCE TO RELATED APPLICATIONS

This application is a continuation of International Application No. PCT/KR2022/018328 designating the United States, filed on Nov. 18, 2022, in the Korean Intellectual Property Receiving Office and claiming priority to Korean Patent Application No. 10-2021-0167719, filed on Nov. 29, 2021, in the Korean Intellectual Property Office, and to Korean Patent Application No. 10-2022-0000535, filed on Jan. 3, 2022, in the Korean Intellectual Property Office, the disclosures of all of which are incorporated by reference herein in their entireties.

BACKGROUND

Field

The disclosure relates to an electronic device making a request for allocating resources for an uplink, a network for allocating resources for an uplink, and a method of operating the same.

Description of Related Art

A user equipment (UE) may establish a connection with a network. After establishing the connection with the network, the UE may make a request for allocating resources for an uplink to the network. For example, the UE may transmit a scheduling request (SR) message which is a message for allocating a physical uplink shared channel (PUSCH) message to the network. The scheduling request message is a message of a special physical layer and may be used for the purpose of making a request for a UL grant (for example, downlink control information (DCI) 0_0 or DCI 0_1) to the network. When receiving the scheduling request message from the UE, the network may the UL grant to the UE in response thereto. The network may allocate uplink resources, for example, PUSCH resources to the UE transmitting the scheduling request message. The UE may receive the UL grant and identify allocated uplink resources, for example, PUSCH resources on the basis thereof. The UE may transmit uplink data to the network through the allocated uplink resources, for example, PUSCH resources.

SUMMARY

When receiving the scheduling request message from the UE, the network may allocate uplink resources, for example, PUSCH resources to the UE in response thereto. In this case, information on the size of uplink data which should be transmitted by the UE is not provided to the network. Accordingly, the network may allocate uplink resources having a predetermined size to the UE in the state in which the size of uplink data which the UE should transmit is not identified. However, when uplink resources having a relatively small size is allocated in consideration of the size of the uplink data which the UE should transmit, a transmission time of the uplink data may relatively increase and transmission/reception of an additional message (for example, a buffer status report (BSR) message) is required, and accordingly overhead may also increase. Alternatively, when uplink resources having a relatively large size are allocated in consideration of the size of the uplink data which the UE should transmit, it is possible to waste limited resources.

Embodiments of the disclosure provide an electronic device and a method of operating the same that may determine transmission power of a scheduling request message on the basis of the size of uplink data which should be transmitted. The network according to various embodiments and a method of operating the same may determine an amount of uplink resources which should be allocated to an electronic device on the basis of the reception size of the scheduling request message received from the corresponding electronic device.

According to various example embodiments, a method of operating a network includes: identifying a scheduling request message from an electronic device through at least one first resource, the at least one first resource including at least a portion of physical uplink control channel (PUCCH) resources allocated to the electronic device; identifying a reception intensity of the scheduling request message in the at least one first resource and identifying at least one second resource allocated to the electronic device, based on the reception intensity, the at least one second resource being allocated for a physical uplink shared channel (PUSCH) of the electronic; and transmitting downlink control information (DCI) including information for identifying the at least one second resource to the electronic device.

According to various example embodiments, a method of operating a network includes: identifying reception of a scheduling request message from an electronic device in at least a portion of physical uplink control channel (PUCCH) resources for the scheduling request message, allocating physical uplink shared channel (PUSCH) resources having a first size to the electronic device based on identification of the scheduling request message in a first set of the PUCCH resources, and allocating PUSCH resources having a second size different from the first size to the electronic device based on identification of the scheduling request message in a second set of the PUCCH resources different from the first set.

According to various example embodiments, a method of operating a network includes: identifying a scheduling request message from an electronic device through at least one first resource, the at least one first resource including at least a portion of physical uplink control channel (PUCCH) resources allocated to the electronic device; identifying a reception intensity of the scheduling request message in the at least one first resource and an operation of transmitting downlink control information (DCI) including information for identifying at least one second resource allocated to the electronic device to the electronic device based on the reception intensity satisfying a specified condition, the at least one second resource being allocated for a physical uplink shared channel (PUSCH) of the electronic device; transmitting downlink control information (DCI) including information for identifying at least one third resource allocated to the electronic device having a size greater than the size of the at least one second resource to the electronic device based on the reception intensity not satisfying the specified condition, and the at least one third resource being allocated for the PUSCH of the electronic device.

According to various example embodiments, an electronic device includes: at least one antenna, a radio frequency (RF) circuit configured to provide RF signals to the at least one antenna, and at least one processor, wherein the at least one processor is configured to: identify a size of uplink data which should be transmitted to a network, control the RF circuit to provide a first RF signal of first transmission power, based on the size of uplink data greater than or equal to a threshold size, the first RF signal corresponding to a scheduling request message causing allocation of physical uplink shared channel (PUSCH) resources having a first resource size to the electronic device, and control the RF circuit to provide a second RF signal of second transmission power different from the first transmission power based on the size of uplink data less than the threshold size, the second RF signal corresponding to a scheduling request message causing allocation of PUSCH resources having a second resource size different from the first resource size to the electronic device.

According to various example embodiments, an electronic device includes: at least one antenna, a radio frequency (RF) circuit configured to provide RF signals to the at least one antenna, and at least one processor, wherein the at least one processor is configured to: identify a size of uplink data which should be transmitted to a network, control the RF circuit to provide a first RF signal using a first set of a plurality of physical uplink control channel (PUCCH) resources, based on the size of uplink data corresponding to a first size, the first RF signal corresponding to a scheduling request message causing allocation of physical uplink shared channel (PUSCH) resources having a first resource size to the electronic device, and control the RF circuit to provide a second RF signal using a second set of the plurality of PUCCH resources different form the first set based on the size of uplink data corresponding to a second size different from the first size, the second RF signal corresponding to a scheduling request message causing allocation of PUSCH resources having a second resource size different from the first resource size to the electronic device.

According to various example embodiments, an electronic device capable of determining transmission power of scheduling request messages on the basis of the size of uplink data which should be transmitted and a method of operating the same can be provided.

According various example embodiments, a network capable of determining uplink resources which should be allocated to the corresponding electronic device on the basis of the reception size of a scheduling request message received from the electronic device and a method of operating the same may be provided. The network can identify information on the size of uplink data which should be transmitted by the electronic device on the basis of the reception intensity of the scheduling request message and thus can allocate uplink resources based on the size of uplink data which should be transmitted. Accordingly, an increase in transmission time and/or an increase in overhead (for example, additional transmission of a B scheduling request message) in the case in which relatively small uplink resources are allocated can be alleviated or the waste of resources in the case in which relatively large uplink resources are allocated can be alleviated.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
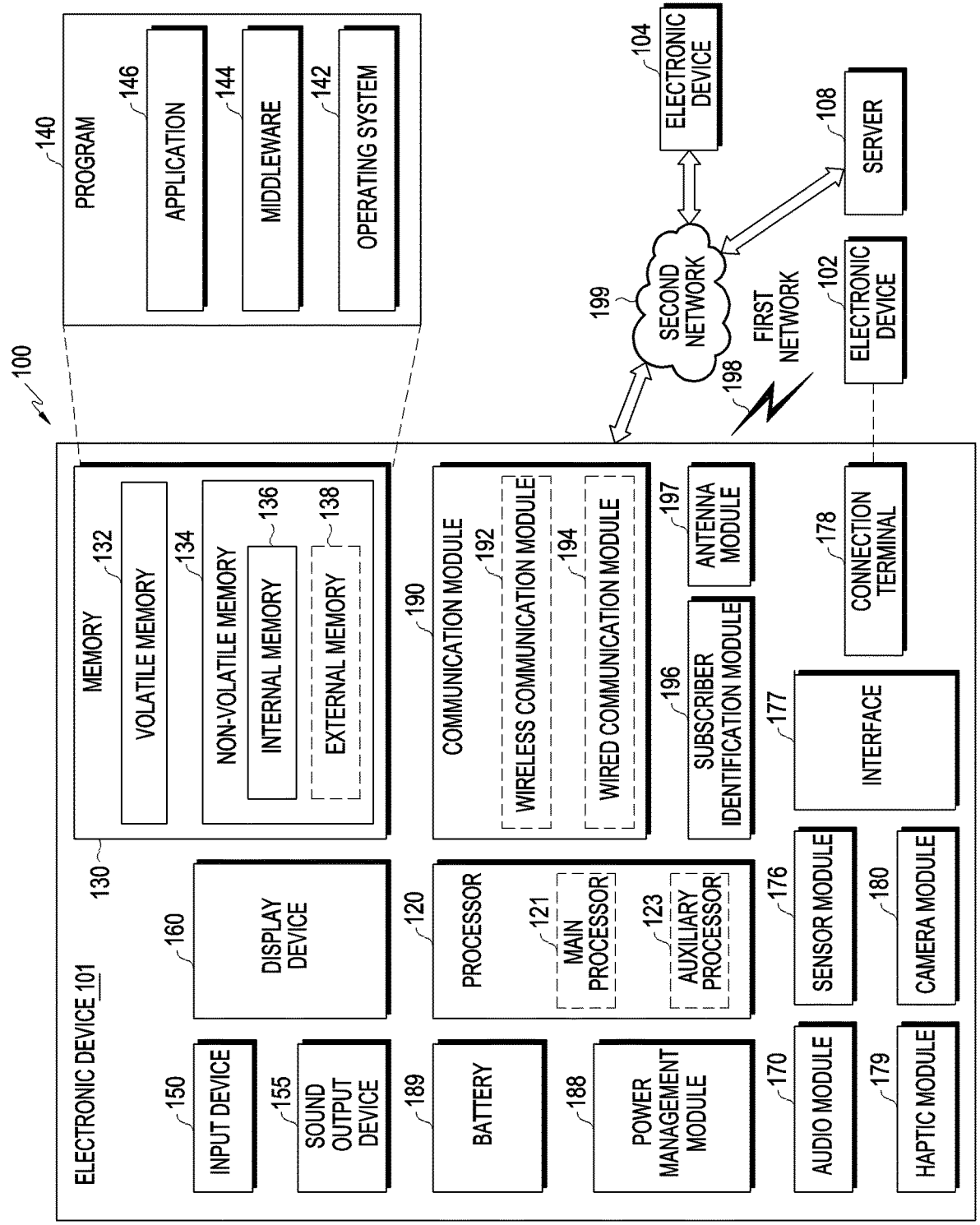
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
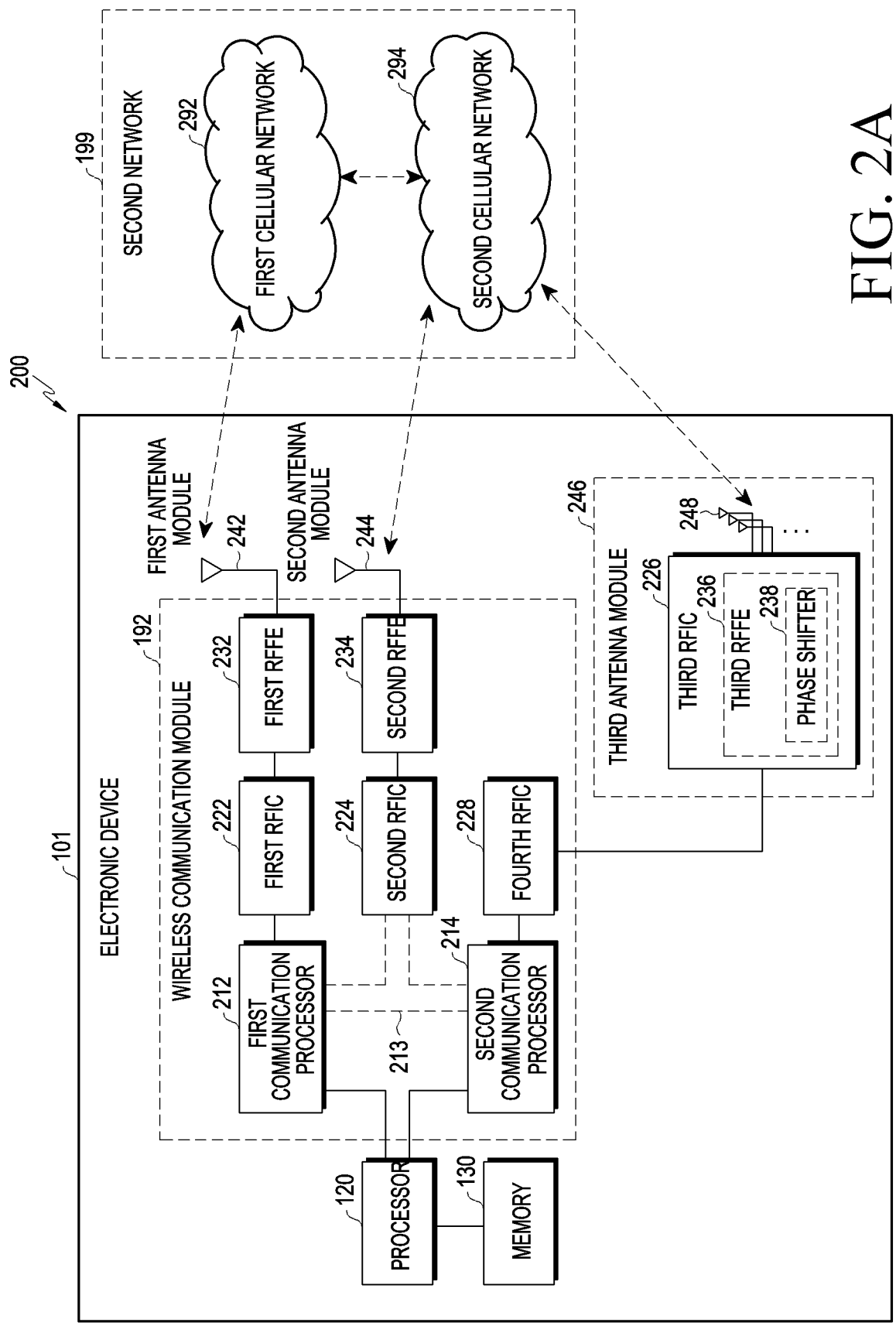
FIG. 2A is a block diagram illustrating an example configuration of an electronic device for supporting legacy network communication and 5G network communication according to various embodiments.

FIG. 2A is a block diagram 200 illustrating an example configuration of the electronic device 101 for supporting legacy network communication and 5G network communication according to various embodiments. Referring to FIG. 2A, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include the processor (e.g., including processing circuitry) 120 and the memory 130. A second network 199 may include a first cellular network 292 and a second cellular network 294. According to an embodiment, the electronic device 101 may further include at least one of the elements illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may configure at least a portion of the wireless communication module 192. According to an embodiment, the fourth RFIC 228 may be omitted or may be included as a part of the third RFIC 226.

The first communication processor 212 may include various processing circuitry and support establishment of a communication channel in a band to be used for wireless communication with the first cellular network 292 and legacy network communication through the established communication channel. According to various embodiments, the first cellular network may be a legacy network including a second generation (2G), 3G, 4G, or long term evolution (LTE) network. The second communication processor 214 may include various processing circuitry and support establishment of a communication channel corresponding to a predetermined band (for example, about 6 GHz to about 60 GHz) among bands to be used for wireless communication with the second cellular network 294 and 5G network communication through the established communication channel According to various embodiments, the second cellular network 294 may be a 5G network defined in the 3GPP. In addition, according to an embodiment, the first communication processor 212 or the second communication processor 214 may support establishment of a communication channel corresponding to another predetermined band (for example, equal to or lower than about 6 GHz) among bands to be used for wireless communication with the second cellular network 294 and 5G network communication through the established communication channel.

The first communication processor 212 may transmit and receive data to and from the second communication processor 214. For example, data classified to be transmitted through the second cellular network 294 may be changed to be transmitted through the first cellular network 292. In this case, the first communication processor 212 may receive transmission data from the second communication processor 214. For example, the first communication processor 212 may transmit and receive data to and from the second communication processor 214 through an interface 213 between processors. The interface 213 between processors may be implemented as, for example, a universal asynchronous receiver/transmitter (UART) (for example, a high speed-UART (HS-UART) or a peripheral component interconnect bus express (PCIe) interface), but there is no limitation in the type thereof. Alternatively, the first communication processor 212 and the second communication processor 214 may exchange control information and packet data information through, for example, a shared memory. The first communication processor 212 may transmit and receive various pieces of information such as sensing information, information on an output intensity, and Resource Block (RB) allocation information to and from the second communication processor 214.

According to implementation, the first communication processor 212 may not be directly connected to the second communication processor 214. In this case, the first communication processor 212 may transmit and receive data to and from the second communication processor 214 through the processor 120 (for example, an application processor). For example, the first communication processor 212 and the second communication processor 214 may transmit and receive data to and from the processor 120 (for example, an application processor) through an HS-UART interface or a PCIe interface, but there is no limitation in the type thereof. Alternatively, the first communication processor 212 and the second communication processor 214 may exchange control information and packet data information with the processor 120 (for example, an application processor) through a shared memory.

Figure 2B:
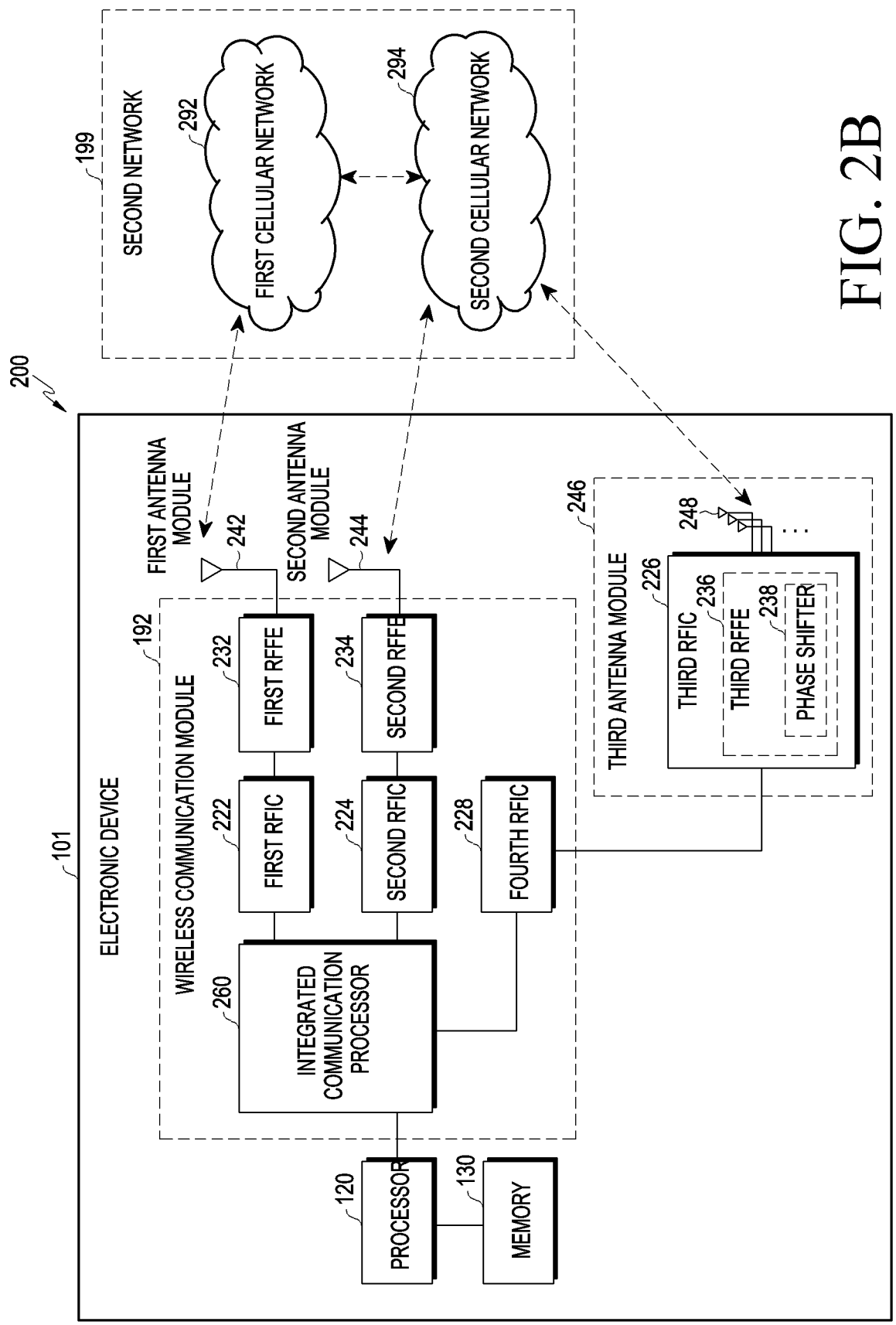
FIG. 2B is a block diagram illustrating an example configuration of the electronic device for supporting legacy network communication and 5G network communication according to various embodiments.

According to an embodiment, the first communication processor 212 and the second communication processor 214 may be implemented within a single chip or a single package. According to various embodiments, the first communication processor 212 or the second communication processor 214 may be configured with the processor 120, the auxiliary processor 123, or the communication module 190 within a single chip or a single package. For example, as illustrated in FIG. 2B, the communication processor 260 may support all functions for communication with the first cellular network 292 and the second cellular network 294.

In transmission, the first RFIC 222 may convert a baseband signal generated by the first communication processor 212 into a radio frequency (RF) signal from about 700 MHz to about 3 GHz used for the first cellular network 292 (for example, the legacy network). In reception, the RF signal may be acquired from the first cellular network 292 (for example, the legacy network) through an antenna (for example, the first antenna module 242) and may be preprocessed through the RFFE (for example, the first RFFE 232). The first RFIC 222 may convert the preprocessed RF signal into a baseband signal to be processed by the first communication processor 212.

In transmission, the second RFIC 224 may convert a baseband signal generated by the first communication processor 212 or the second communication processor 214 into an RF signal (hereinafter, referred to as a 5G Sub6 RF signal) in a Sub6 band (for example, equal to or lower than about 6 GHz) used by the second cellular network 294 (for example, the 5G network). In reception, a 5G Sub6 RF signal may be acquired from the second network 294 (for example, the 5G network) through an antenna (for example, the second antenna module 244) and may be preprocessed through the RFFE (for example, the second RFFE 234). The second RFIC 224 may convert the preprocessed 5G Sub6 RF signal into a baseband signal to be processed by the corresponding communication processor among the first communication processor 212 or the second communication processor 214.

The third RFIC 226 may convert a baseband signal generated by the second communication processor 214 into an RF signal (hereinafter, referred to as a 5G Above6 RF signal) in a 5G Above6 band (for example, from about 6 GHz to about 60 GHz) to be used by the second network 294 (for example, the 5G network). In reception, a 5G Above6 RF signal may be acquired from the second network 294 (for example, the 5G network) through an antenna (for example, the antenna 248) and may be preprocessed through the third RFFE 236. The third RFIC 226 may convert the preprocessed 5G Above6 RF signal into a baseband signal to be processed by the second communication processor 214. According to an embodiment, the third RFFE 236 may be configured as a part of the third RFIC 226.

The electronic device 101 may include the fourth RFIC 228 separately from the third RFIC 226 or as a part thereof according to an embodiment. In this case, the fourth RFIC 228 may convert the baseband signal generated by the second communication processor 214 into an RF signal (hereinafter, referred to as an IF signal) in an intermediate frequency band (for example, about 9 GHz to about 11 GHz) and then transfer the IF signal to the third RFIC 226. The third RFIC 226 may convert the IF signal into a 5G Above6 RF signal. In reception, a 5G Above6 RF signal may be received from the second network 294 (for example, the 5G network) through an antenna (for example, antenna 248) and converted into an IF signal by the third RFIC 226. The fourth RFIC 228 may convert the IF signal into a baseband signal to be processed by the second communication processor 214.

According to an embodiment, the first RFIC 222 and the second RFIC 224 may be implemented as at least a portion of a single chip or a single package. According to various embodiments, when the first RFIC 222 and the second RFIC 224 are implemented as a single chip or a single package in FIG. 2A or FIG. 2B, they may be implemented as an integrated RFIC. In this case, the integrated RFIC may be connected to the first RFFE 232 and the second RFFE 234 to convert a baseband signal into a signal in a band supported by the first RFFE 232 and/or the second RFFE 234, and may transmit the converted signal to one of the first RFFE 232 and the second RFFE 234. According to an embodiment, the first RFFE 232 and the second RFFE 234 may be implemented as at least a portion of a single chip or a single package. According to an embodiment, at least one of the first antenna module 242 or the second antenna module 244 may be omitted or may be connected to another antenna module to process RF signals in a plurality of corresponding bands.

According to an embodiment, the third RFIC 226 and the antenna 248 may be disposed on the same substrate to configure the third antenna module 246. For example, the wireless communication module 192 or the processor 120 may be disposed on a first substrate (for example, a main PCB). In this case, the third RFIC 226 may be disposed in a partial area (for example, bottom side) of a second substrate (for example, a sub PCB) separated from the first substrate and the antenna 248 may be disposed in another partial area (for example, top side) to configure the third antenna module 246. By disposing the third RFIC 226 and the antennas 248 on the same substrate, it is possible to reduce the length of a transmission line therebetween. This may reduce loss (for example, attenuation) of the signal in a high frequency band (for example, about 6 GHz to about 60 GHz) used for 5G network communication by the transmission line. Accordingly, the electronic device 101 may increase a quality or a speed of communication with the second network 294 (for example, 5G network).

According to an embodiment, the antennas 248 may be configured as an antenna array including a plurality of antennal elements which can be used for beamforming. In this case, the third RFIC 226 may include, for example, a plurality of phase shifters 238 corresponding to the plurality of antenna elements as a part of the third RFFE 236. In transmission, each of the plurality of phase shifters 238 may convert a phase of a 5G Above6 RF signal to be transmitted to the outside of the electronic device 101 (for example, a base station of the 5G network) through a corresponding antenna element. In reception, each of the plurality of phase shifters 238 may convert the phase of the 5G Above6 RF signal received from the outside through the corresponding antenna element into the same phase or substantially the same phase. This enables transmission or reception through beamforming between the electronic device 101 and the outside.

The second network 294 (for example, the 5G network) may operate independently from the first cellular network 292 (for example, the legacy network) (for example, stand-alone (SA)) or may operate through a connection to the first cellular network 292 (for example, non-stand alone (NSA)). For example, in the 5G network, only an access network (for example, a 5G Radio Access Network (RAN) or a Next Generation RAN (NG RAN)) may exist without a core network (for example, a Next Generation Core (NGC)). In this case, the electronic device 101 may access the access network of the 5G network and then access an external network (for example, the Internet) under the control of the core network (for example, evolved packed core (EPC)) of the legacy network. Protocol information (for example, LTE protocol information) for communication with the legacy network and protocol information (for example, new radio (NR) protocol information) for communication with the 5G network may be stored in the memory 230 and may be accessed by another element (for example, the processor 120, the first communication processor 212, or the second communication processor 214).

Terms for identifying access nodes used in the following description, terms referring to network entities, terms referring to messages, terms referring to interfaces between network entities, and terms referring to various pieces of identification information are used for convenience of description. For convenience of the following description, terms and names defined in the standard of the 5G system are used in various embodiments of the disclosure. However, the disclosure is not limited by the terms and names, and may be equally applied to a system that is based on another standard. For example, the communication standard defined by the 3GPP may be described, but the disclosure can be modified and applied to other communication systems having a similar technical background without departing from the scope of the disclosure, which can be determined by those skilled in the art of the disclosure.

Figure 3A:
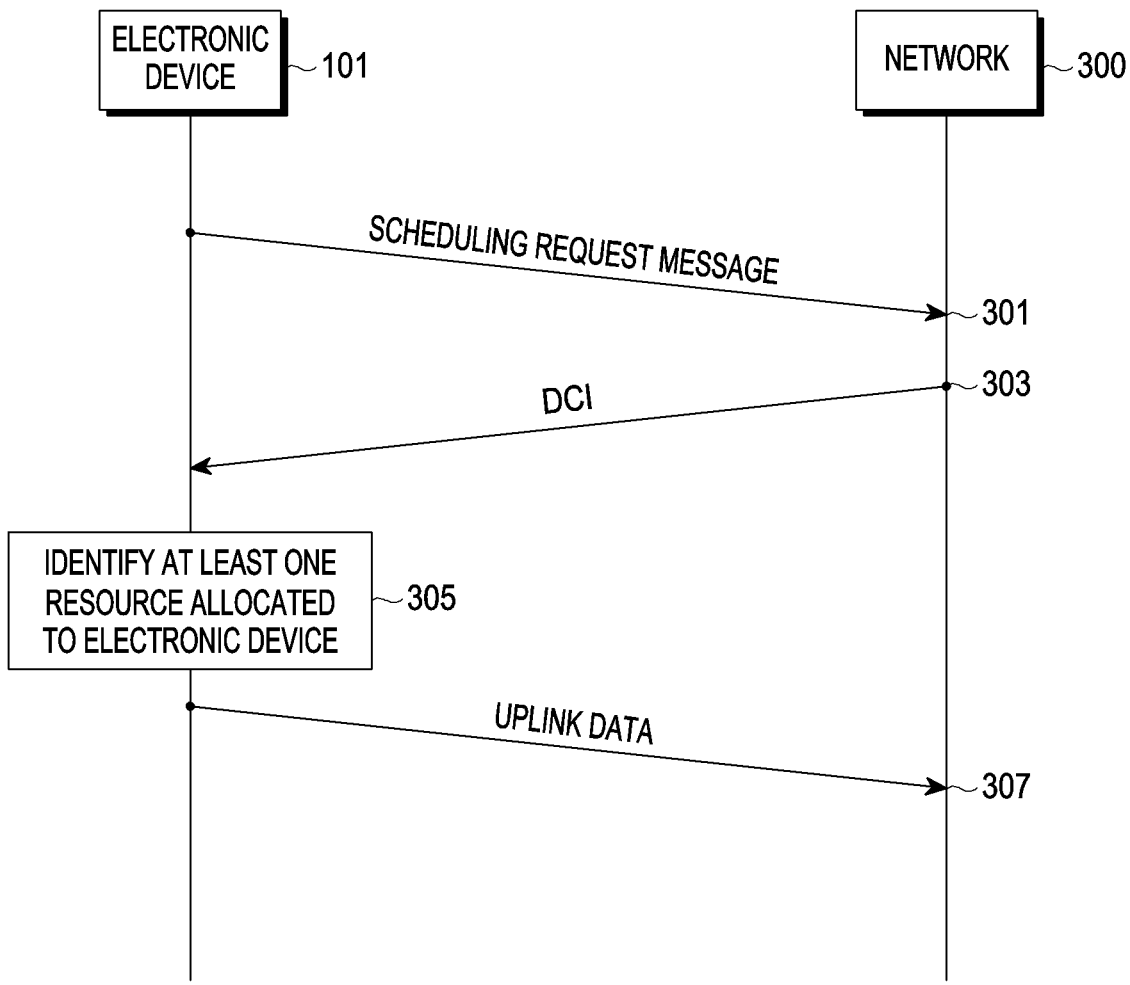
FIG. 3A is a signal flow diagram illustrating an example method of operating an electronic device and a network according to a comparative example for comparison with various embodiments.

FIG. 3A is a signal flow diagram illustrating an example method of operating an electronic device and a network according to a comparative example for comparison with various embodiments. At least one of the operations performed by the electronic device and the network according to the comparative example may be performed by the electronic device and the network according to various embodiments.

The electronic device 101 (for example, at least one of the processor 120, the first communication processor 212, the second communication processor 214, or the integrated communication processor 260) may transmit a scheduling request message (hereafter, interchangeably used with a scheduling request (SR) message) to the network 300 in operation 301. The network 300 may be, for example, a base station but there is no limitation if the base station is a device supporting a function allocating resources to the electronic device 101, and may include, for example, at least one storage circuit for storing instructions causing at least one operation of the network 300 and at least one processing circuit for executing instructions. For example, the electronic device 101 may transmit the scheduling request message to the network 300 on the basis of generation (or identification) of uplink data which should be transmitted. The network 300 may identify whether to allocate uplink resources, for example, PUSCH resources to the electronic device 101 on the basis of reception of the received scheduling request message. When it is identified to allocate uplink resources, for example, PUSCH resources to the electronic device 101, the network 300 may transmit DCI to the electronic device 101 in operation 303. The DCI may correspond to, for example, a UL grant and may include information related to the allocated uplink resources. For example, the DCI may include the information related to the allocated uplink resources (for example, information included in a resource allocation field) and/or information for identifying the related information. The information related to the uplink resources (for example, information included in the resource allocation field) may include, for example, a start resource block ($RB_{START}$) and a resource indication value (RIV) corresponding to the length in terms of contiguously allocated resource blocks ($L_{CRBs}$), but it is only an example (for example, an example of uplink resource allocation type 0) and there is no limitation if the information is used by the electronic device 101 to identify the allocated uplink resources. For example, information for allocating uplink resources or an allocation scheme thereof may follow the standard that is $3^{rd}$ generation partnership project (3GPP) technical specification (TS) 36.213 or TS 38.214, but it is also an example and there is no limitation. When the length in terms of contiguously allocated resource blocks ($L_{CRBs}$) is a relatively large value (for example, 30), it may refer, for example, to uplink resources, for example, a PUSCH having a relatively large size is allocated to the electronic device 101. When the length in terms of contiguously allocated resource blocks ($L_{CRBs}$) is a relatively small value (for example, 10), it may refer, for example, to uplink resources, for example, a PUSCH having a relatively small size being allocated to the electronic device 101.

The electronic device 101 may identify at least one resource allocated to the electronic device 101 on the basis of the received DCI in operation 305. For example, the electronic device 101 may identify at least one allocated resource, for example, PUSCH resources on the basis of the RIV identified according to the received DCI, but will be understood by those skilled in the art that there is no limitation in the identification scheme and the information for identifying the same as or similar to that described above. The electronic device 101 may transmit uplink data through at least one resource, for example, PUSCH resources in operation 307. The network 300 according to the comparative example may determine the size of resources allocated to the electronic device 101 but may not be determined on the basis of the size of uplink data which the electronic device 101 should transmit. Accordingly, there is a possibility that the network 300 according to the comparative example allocates uplink resources having the relatively large size when the size of uplink data which the electronic device 101 should transmit is relatively small or that the network allocates uplink resources having the relatively small size when the size of uplink data which the electronic device 101 should transmit is relatively large. Operations of the electronic device 101 and the network 300 according to the comparative example of the case in which uplink resources having the relatively large size are allocated when the size of uplink data which the electronic device 101 should transmit is relatively small are described with reference to FIG. 3B.

Figure 3B:
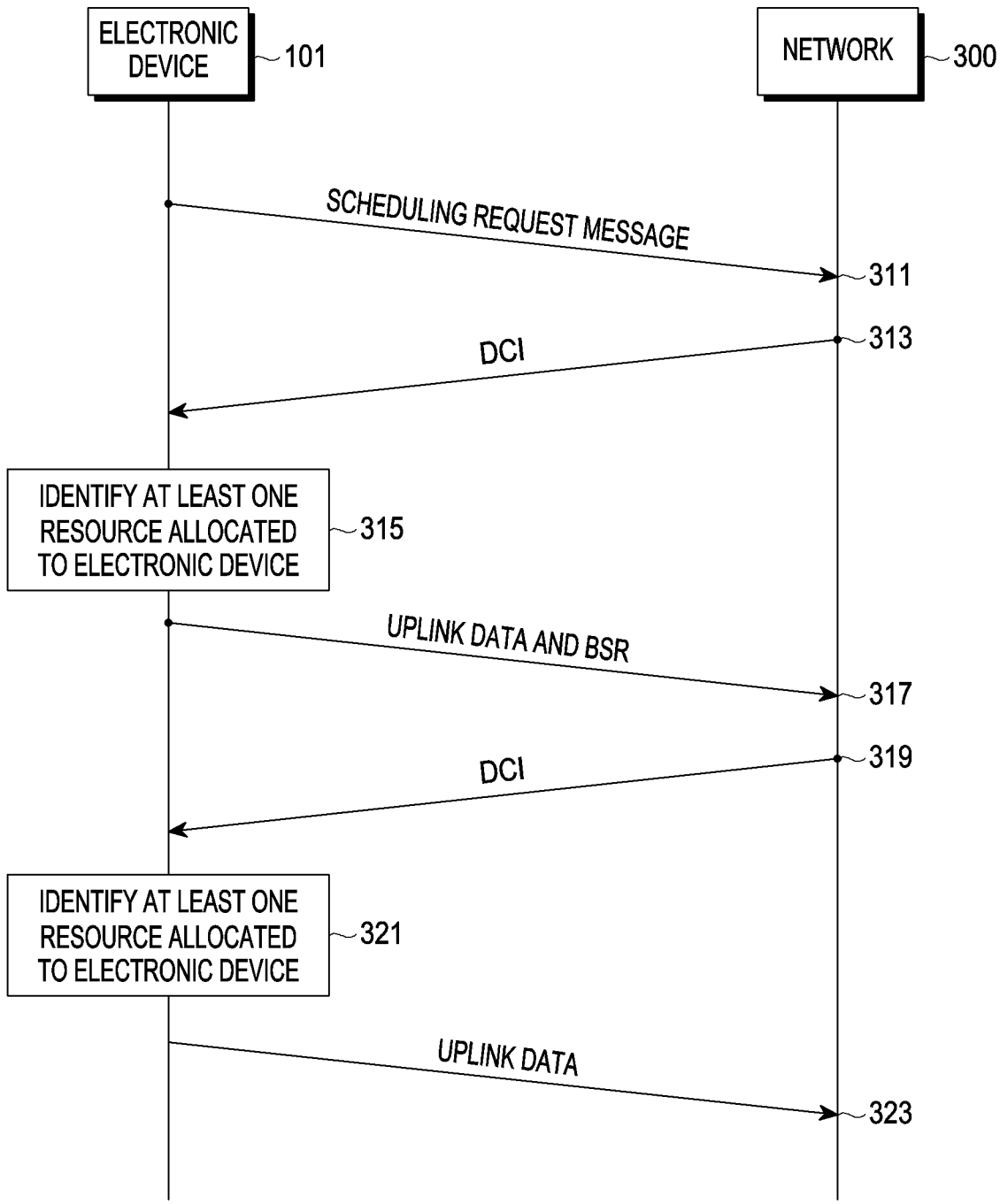
FIG. 3B is a signal flow diagram illustrating an example method of operating the electronic device and the network according to the comparative example for comparison with various embodiments.

FIG. 3B is a signal flow diagram illustrating an example method of operating the electronic device and the network according to the comparative example for comparison with various embodiments. At least one of the operations performed by the electronic device and the network according to the comparative example may be performed by the electronic device and the network according to various embodiments.

The electronic device 101 (for example, at least one of the processor 120, the first communication processor 212, the second communication processor 214, or the integrated communication processor 260) may transmit the scheduling request message to the network 300 in operation 311. The network 300 may transmit DCI corresponding to the scheduling request message to the electronic device 101 in operation 313. The electronic device 101 may identify at least one resource allocated to the electronic device 101 on the basis of the DCI in operation 315. The electronic device 101 may transmit UL data and a buffer state reporting (BSR) message to the network 300 on the basis of at least one allocated resource in operation 317. For example, when the size of resources allocated to the electronic device 101 is relatively small, the electronic device 101 may transmit a B scheduling request message causing an increase in the size of the resources allocated to the electronic device 101 to the network 300. The B scheduling request message may include information indicating how much data exist within the buffer of the electronic device, but there is no limitation. The network 300 may transmit DCI for identifying resources allocated to the electronic device 101 to the electronic device 101 on the basis of the B scheduling request message in operation 319. Meanwhile, although the electronic device 101 transmits the B scheduling request message once in the comparative example of FIG. 3B, this is only an example and the electronic device 101 may transmit the B scheduling request message multiple times. The electronic device 101 may identify at least one resource allocated to the electronic device 101 on the basis of the received DCI in operation 321. The electronic device 101 may transmit uplink data through at least one resource, for example, PUSCH resources in operation 323. As described, when the size of data within the buffer of the electronic device 101 is relatively large, the electronic device 101 may transmit the B scheduling request message multiple times and, accordingly, overhead may increase and/or a transmission time of UL data may be delayed.

Figure 4A:
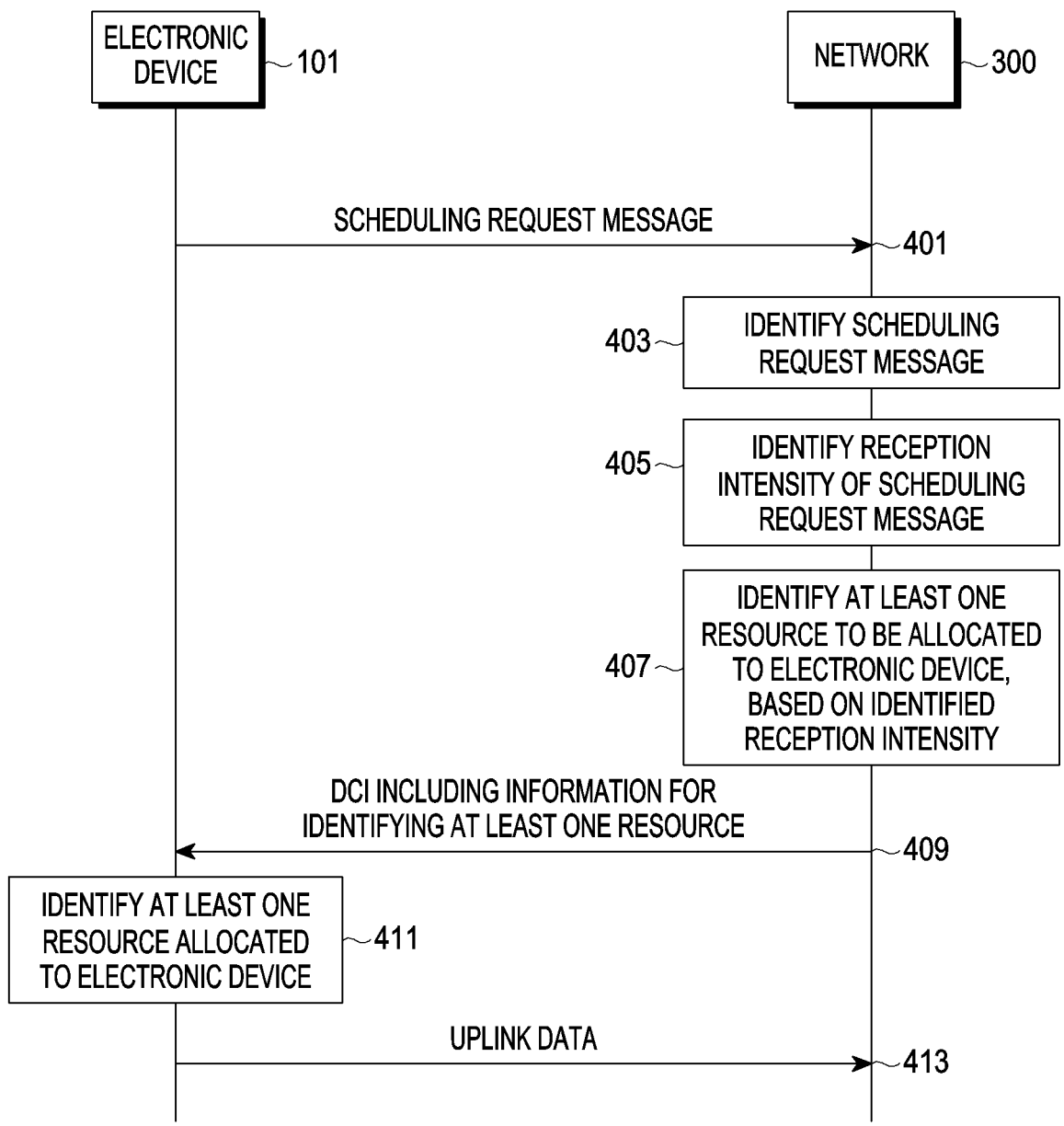
FIG. 4A is a signal flow diagram illustrating an example method of operating an electronic device and a network according to various embodiments.
Figure 4B:
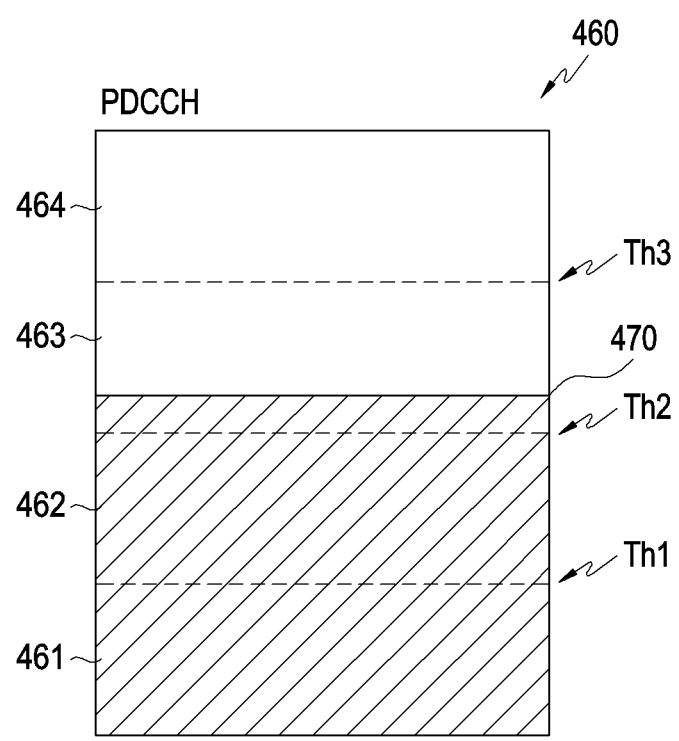
FIG. 4B is a diagram illustrating the size of resources allocated for each reception intensity measured by the network according to various embodiments.

FIG. 4A is a signal flow diagram illustrating an example method of operating an electronic device and a network according to various embodiments. The embodiment of FIG. 4A will be described with reference to FIG. 4B. FIG. 4B is a diagram illustrating the size of resources allocated for each reception intensity measured by the network according to various embodiments.

According to various embodiments, the electronic device 101 (for example, at least one of the processor 120, the first communication processor 212, the second communication processor 214, or the integrated communication processor 260) may transmit the scheduling request message to the network 300 through at least one first resource (For example, at least one resource of a physical uplink control channel (PUCCH) in operation 401. For example, the electronic device 101 may determine a transmission intensity of the scheduling request message, for example, output power of an RF signal (or transmission power of the PUCCH) corresponding to the scheduling request message on the basis of the size of uplink data which should be transmitted, which will be described below. The network 300 may identify the scheduling request message received through at least one first resource (for example, at least one resource of the PUCCH) in operation 403. Meanwhile, the PUCCH which is a physical channel for transmitting the scheduling request message is only an example, and there is no limitation in a transmitted channel.

According to various embodiments, the network 300 may identify the reception intensity of the scheduling request message in operation 405. For example, the network 300 may measure the reception intensity in at least one first resource (for example, at least one resource of the PUCCH). The reception intensity may include at least one of, for example, reference signal received power (RSRP), reference signal received quality (RSRQ), reference signal strength indicator (RSSI), or signal to interference-plus-noise ratio (SINR), but it will be understood by those skilled in the art that there is limitation and any index related to the size of the identified RF signal can be the reception intensity. The network 300 may identify at least one resource, for example, PUSCH resource to be allocated to the electronic device 101 on the basis of the identified reception intensity in operation 407. In an example, the network 300 may configure in advance association information between a plurality of reception intensity ranges and a plurality of allocated resource sizes. [Table 1] shows an example of association information between the of reception intensity ranges and the plurality of allocated resource sizes.

TABLE 1

| Ranges of reception intensity | Sizes of allocated resources (for example, $L_{CRBs}$) |
|---|---|
| First range | First size |
| Second range | Second size |
| Third range | Third size |

The association information in [Table 1] may be stored and/or managed in advance by, for example, the network 300. A configuration for configuring the association information shown in [Table 1] by the network 300 is described below. When the number of accessing Ues is plural, the network 300 may separately manage the association information in [Table 1] according to the plurality of Ues. For example, referring to FIG. 4B, the electronic device 101 may configure at least one threshold value Th1, Th2, and Th3 for identifying ranges of the reception intensities 460 measured in the PDCCH. For example, when the reception intensity having the size less than the first threshold (Th1) is measured (for example, when the reception intensity is included in a zeroth range 461), the network 300 may determine that the scheduling request message is not received in the PDCCH. For example, when the reception intensity having the size greater than the first threshold value (Th1) and less than the second threshold value (Th2) (for example, when the reception intensity is included in a first range 462), the network 300 may identify a first size corresponding to the first range in [Table 1]. For example, when the reception intensity having the size greater than the second threshold value (Th2) and less than the third threshold value (Th3) (for example, when the reception intensity is included in a second range 463), the network 300 may identify a second size corresponding to the second range in [Table 1]. For example, when the reception intensity having the size greater than the second threshold value (Th2) is measured (for example, when the reception intensity is included in a third range 464), the network 300 may identify a third size corresponding to the third range in [Table 1]. The network 300 may identify the size of allocated resources corresponding to the range including the reception identify identified in operation 405 with reference to the association information. For example, when the reception intensity (for example, the reception intensity 470 of FIG. 4B) identified in operation 405 is included in the second range in [Table 1], the network 300 may determine that the size of resources allocated to the electronic device 101 transmitting the corresponding scheduling request message is the second size corresponding to the second range. Meanwhile, the scheme for determining the size of allocated resources on the basis of the association information shown in [Table 1] is only an example, and it may be understood by those skilled in the art that there is no limitation if the scheme is a scheme in which the size of the reception corresponds to the size of allocated resources.

According to various embodiments, the network 300 may transmit DCI including information for identifying at least one resource, for example, PUSCH resources to the electronic device 101 in operation 409. The electronic device 101 may identify at least one resource, for example, PUSCH resources allocated to the electronic device 101 on the basis of the DCI in operation 411. The electronic device 101 may transmit uplink data to the network 300 through at least one identified resource, for example, PUSCH resources in operation 413.

According to the above description, the electronic device 101 may transmit the scheduling request message to have the transmission size corresponding to the case in which the size of uplink data which should be transmitted is relatively small, and the network 300 may allocate the PUSCH having the relatively small size to the electronic device 101 according to the reception intensity of the scheduling request message. The electronic device 101 may transmit the scheduling request message to have the transmission size corresponding to the case in which the size of uplink data which should be transmitted is relatively large, and the network 300 may allocate the PUSCH having the relatively large size to the electronic device 101 according to the reception intensity of the scheduling request message. Accordingly, the waste of resources operated by the network 300, a transmission delay of uplink data through the PUSCH, or an increase in overhead (for example, additional transmission of the B scheduling request message) may be alleviated.

Figure 5A:
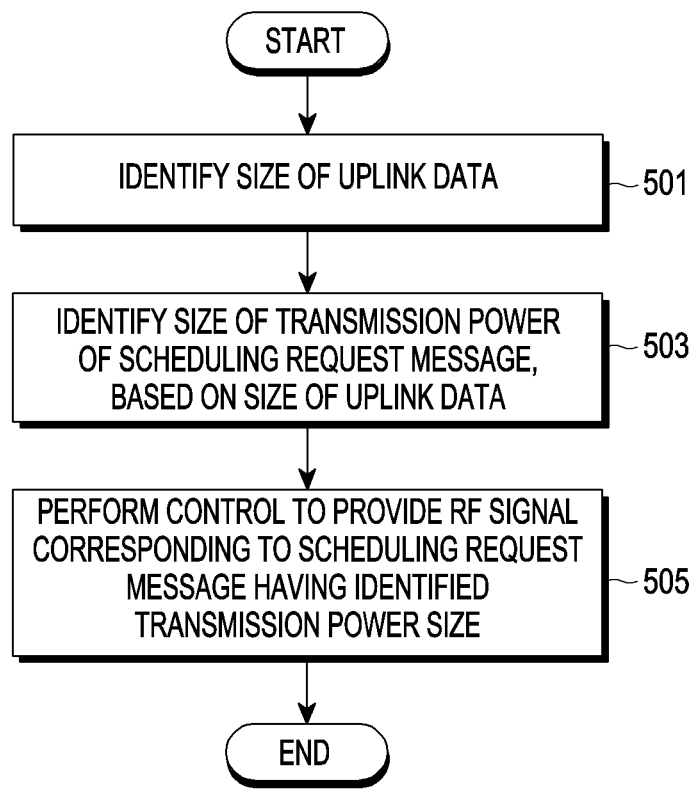
FIG. 5A is a flowchart illustrating an example method of operating an electronic device according to various embodiments.

FIG. 5A is a flowchart illustrating an example method of operating an electronic device according to various embodiments.

According to various embodiments, the electronic device 101 (for example, at least one of the processor 120, the first communication processor 212, the second communication processor 214, or the integrated communication processor 260) may identify the size of uplink data which should be transmitted in operation 501. For example, the electronic device 101 may identify the size of data stored in the buffer as the size of uplink data which should be transmitted, but it is only an example and there is no limitation in a scheme for identifying the size of uplink data which should be transmitted or the type of referenced data. The electronic device 101 may identify the size of transmission power of the scheduling request message on the basis of the size of uplink data which should be transmitted in operation 503. In an example, the electronic device 101 may store and/or manage association information between the size of uplink data which should be transmitted and the size of transmission power. [Table 2] shows an example of association information between the size of uplink data which should be transmitted and the size of transmission power.

TABLE 2

| Ranges of size of uplink data which should be transmitted | Sizes of transmission power |
|---|---|
| First range | First size |
| Second range | Second size |
| Third range | Third size |

For example, when the size of uplink data is included in the second range, the electronic device 101 may determine that the second size corresponding to the second range is transmission power of an RF signal corresponding to the scheduling request message. The size of transmission power may be expressed in units of dBm in one example. In another example, the size of transmission power may be expressed as a percentage of maximum transmission power corresponding to the PUSCH, in which case the first size may indicated as, for example, 80%, the second size may be indicated as, for example, 90%, and the third size may be indicated as, for example, 100%. When 90% is selected, the electronic device 101 may determine to provide the RF signal with transmission power corresponding to 90% of maximum transmission power corresponding to the PUSCH configured on the basis of the standard (for example, 3GPP TS 36.213 or TS 38.213). A configuration for acquiring the association information in [Table 2] is described below.

The electronic device 101 according to various embodiments may perform control to provide the RF signal corresponding to the scheduling request message having the identified size of transmission power in operation 505. In various embodiments, controlling provision of the RF signal corresponding to the scheduling request message having the identified size of transmission power may refer, for example, to an RF circuit (For example, at least one RFIC and/or at least one RFFE) being controlled to input the RF signal having the identified size of transmission power into at least one antenna port, but there is no limitation.

Figure 5B:
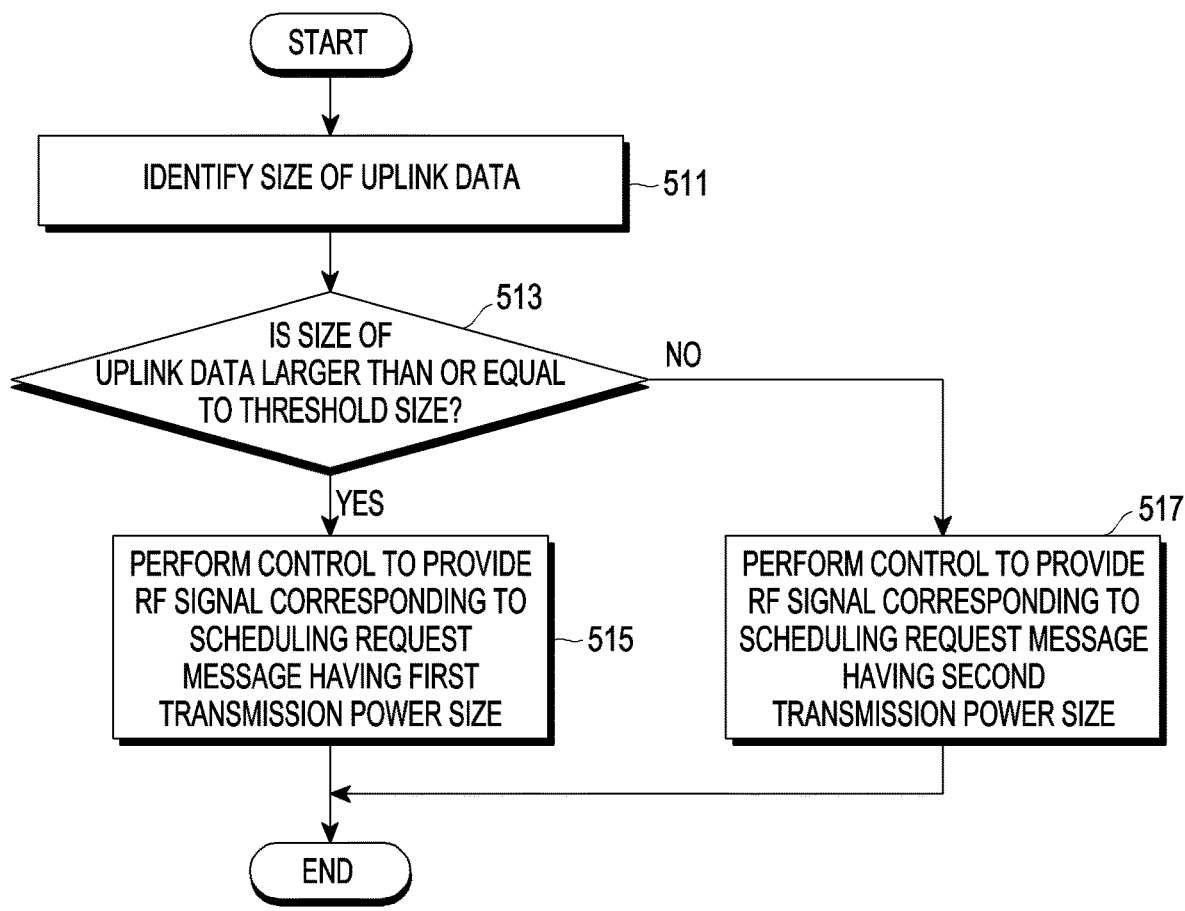
FIG. 5B is a flowchart illustrating an example method of operating an electronic device according to various embodiments.

FIG. 5B is a flowchart illustrating an example method of operating an electronic device according to various embodiments.

According to various embodiments, the electronic device 101 (for example, at least one of the processor 120, the first communication processor 212, the second communication processor 214, or the integrated communication processor 260) may identify the size of uplink data which should be transmitted in operation 511. The electronic device 101 may identify whether the size of uplink data is greater than or equal to the threshold size in operation 513. When the size of uplink data is greater than or equal to the threshold size (Yes of operation 513), the electronic device 101 may perform control to provide an RF signal corresponding to the scheduling request message having the first transmission power size in operation 515. When the size of uplink data is less than the threshold size (No of operation 513), the electronic device 101 may perform control to provide an RF signal corresponding to the scheduling request message having the second transmission power size in operation 517. For example, in operation 515 and operation 517, it is assumed that PUCCH transmission power configured on the basis of at least the information from the network is the same. The electronic device 101 may determine transmission power of the RF signal corresponding to different scheduling request messages according to the size of uplink data in the state in which the same PUCCH transmission power is configured. For example, when the PUCCH transmission power is configured as a first size (for example, A dBm) and the size of data which should be transmitted is a first data size, at least one RFIC and/or at least one RFFE may be controlled to input the RF signal having the first size (for example, A dBm) into the antenna port. For example, when the PUCCH transmission power is configured as a second size (for example, B dBm) and the size of data which should be transmitted is a second data size different from the first data size, at least one RFIC and/or at least one RFFE may be controlled to input the RF signal having the third size (for example, C dBm) into the antenna port. One of the second size (for example, B dBm) and the third size (for example, C dBm) may be the same as the first size (for example, A dBm), but there is no limitation.

Figure 6:
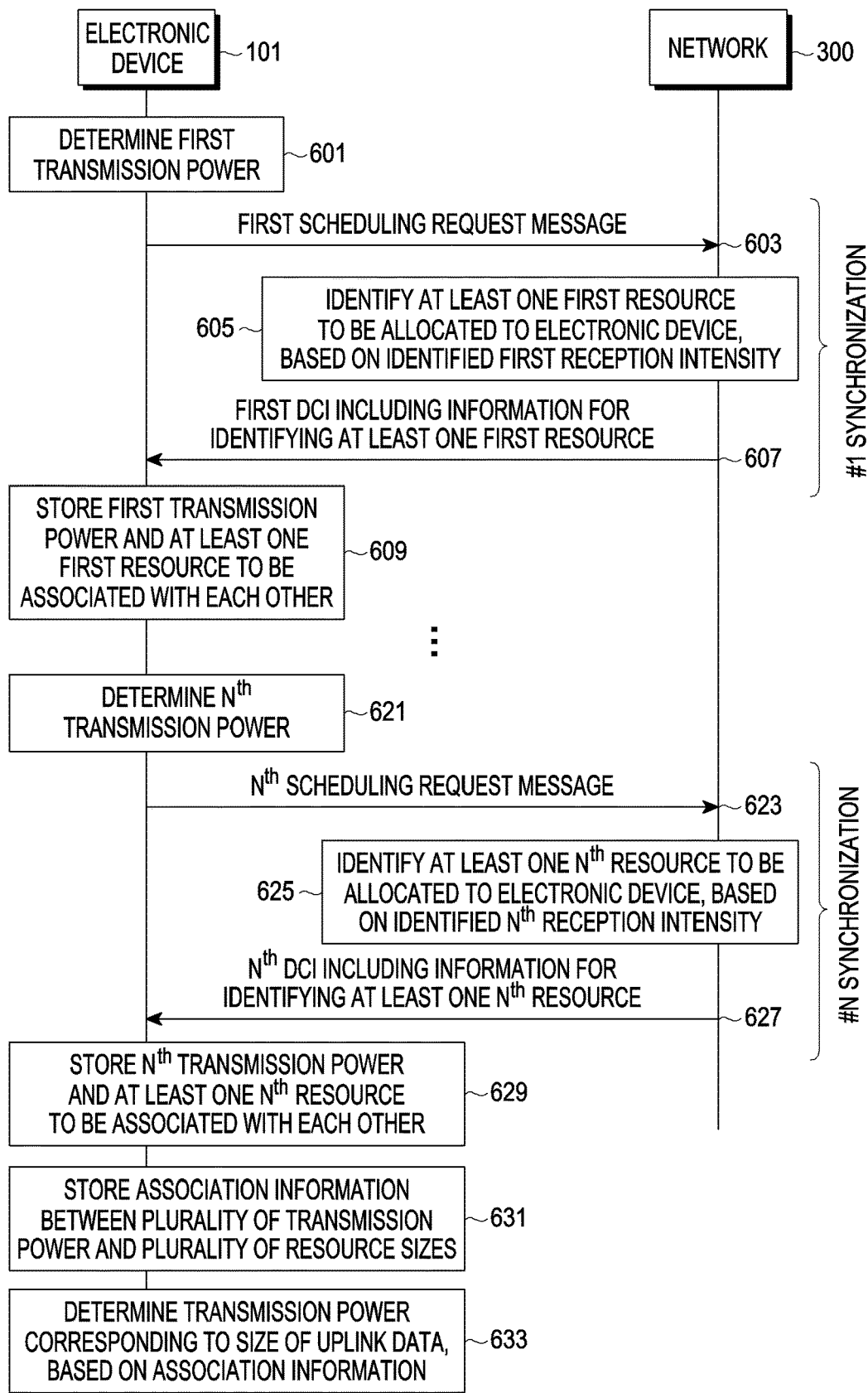
FIG. 6 is a signal flow diagram illustrating an example method of operating an electronic device and a network according to various embodiments.

FIG. 6 is a signal flow diagram illustrating an example method of operating an electronic device and a network according to various embodiments.

According to various embodiments, the electronic device 101 (for example, at least one of the processor 120, the first communication processor 212, the second communication processor 214, or the integrated communication processor 260) may determine first transmission power as transmission power of the RF signal corresponding to the scheduling request message in operation 601. The electronic device 101 may transmit a first scheduling request message to the network 300 in operation 603. The electronic device 101 may perform control to input the RF signal of the first transmission power to the antenna port and, accordingly, the first scheduling request message may be transmitted. The network 300 may identify at least one first resource to be allocated to the electronic device 101 on the basis of the identified first reception intensity in operation 605. As described above, the network 300 may allocate PUSCH resources on the basis of the reception intensity and, accordingly, may identify at least one first resource corresponding to the first reception intensity. The network 300 may transmit first DCI including information for identifying at least one first resource to the electronic device 101 in operation 607. The electronic device 101 may store the first transmission power and at least one first resource to be associated with each other in operation 609. The electronic device 101 may identify at least one first resource on the basis of at least the information included in the first DCI and store at least one identified first resource to be associated with the first transmission power. The above-described operations may be performed for configuring association information between transmission power and resources allocated by the network 300 rather than actually transmitting uplink data by the electronic device 101, but it is only an example, and the operations may be performed as a portion of the process of transmitting uplink data, which may be named a power synchronization operation. The electronic device 101 may perform the power synchronization operation multiple times.

For example, the electronic device 101 may determine $N^{th}$ transmission power as transmission power of the RF signal corresponding to the scheduling request message in operation 621. The $N^{th}$ transmission power may be different from the first transmission power. The electronic device 101 may determine, for example, $N^{th}$ transmission power greater than the first transmission power or determine $N^{th}$ transmission power less than the first transmission power in another example. There is no limitation in the control of transmission power according to the power synchronization operation. The electronic device 101 may transmit an $N^{th}$ scheduling request message to the network 300 in operation 623. The electronic device 101 may perform control to input the RF signal of the $N^{th}$ transmission power to the antenna port and, accordingly, the $N^{th}$ scheduling request message may be transmitted. The network 300 may identify at least one $N^{th}$ resource to be allocated to the electronic device 101 on the basis of the identified $N^{th}$ reception intensity in operation 625. As described above, the network 300 may allocate PUSCH resources on the basis of the reception intensity and, accordingly, may identify at least one $N^{th}$ resource corresponding to the $N^{th}$ reception intensity. The network 300 may transmit $N^{th}$ DCI including information for identifying at least one $N^{th}$ resource to the electronic device 101 in operation 627. The electronic device 101 may store the $N^{th}$ transmission power and at least one $N^{th}$ resource to be associated with each other in operation 629. The electronic device 101 may identify at least one $N^{th}$ resource on the basis of at least the information included in the $N^{th}$ DCI and store at least one identified $N^{th}$ resource to be associated with the $N^{th}$ transmission power. The electronic device 101 may store association information between a plurality of transmission power and a plurality of resource sizes using association information between the first transmission power and at least one first resource and association information between the $N^{th}$ transmission power and at least one $N^{th}$ resource in operation 631. The association information between the plurality of transmission power and the plurality of resource sizes may be expressed as, for example, association information between the transmission power and the resource size.

According to various embodiments, the electronic device 101 may identify the generation of uplink data. The electronic device 101 may determine transmission power corresponding to the size of uplink data on the basis of association information in operation 633. For example, the electronic device 101 may determine the size of resources which should be allocated according to the size of uplink data and determine transmission power corresponding to the determined size of resources on the basis of the stored association information. In another example, the electronic device 101 may configure in advance association information between the size of uplink data and the transmission power as shown in [Table 2] and determine transmission power on the basis of the association information as shown in [Table 2].

For example, an mMTC device may transmit a scheduling request message using transmission power causing allocation of resources having a relatively small size. For example, when transmitting an SMS message, a text message, or an Internet control message protocol (ICMP) message, the electronic device 101 may transmit the scheduling request message using the transmission power causing allocation of resources having the relatively small size. For example, when the electronic device 101 uses a video call service, the electronic device may transmit a scheduling request message using transmission power causing allocation of resources having a relatively large size.

Figure 7:
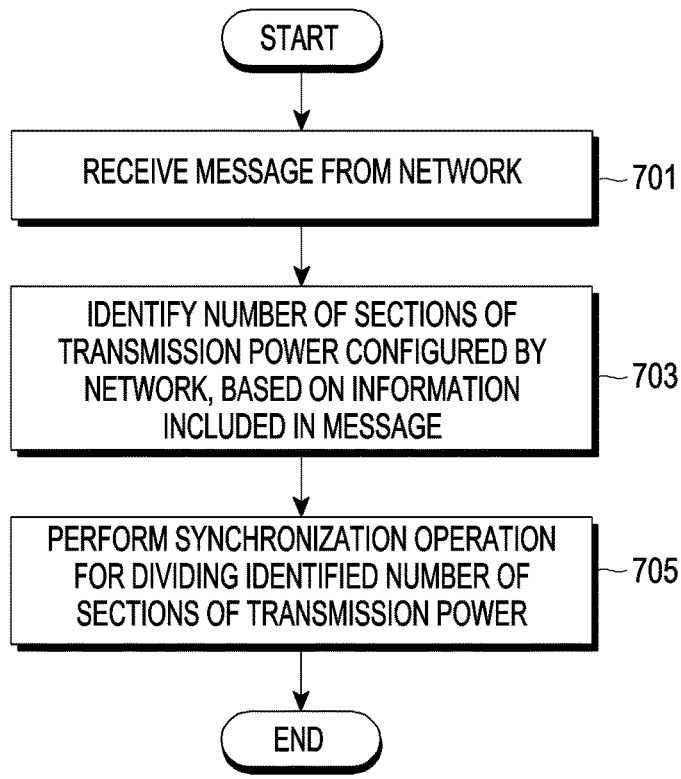
FIG. 7 is a flowchart illustrating an example method of operating an electronic device according to various embodiments.
Figure 8:
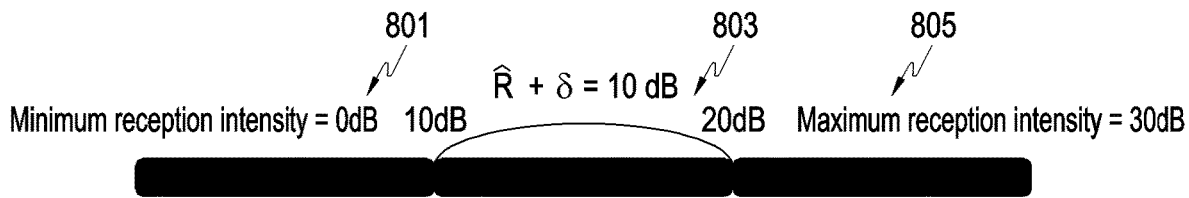
FIG. 8 is a diagram illustrating the number of reception intensity ranges according to various embodiments.

FIG. 7 is a flowchart illustrating an example method of operating an electronic device according to various embodiments. The embodiment of FIG. 7 is described with reference to FIG. 8. FIG. 8 is a diagram illustrating the number of reception intensity ranges according to various embodiments.

According to various embodiments, the electronic device 101 (for example, at least one of the processor 120, the first communication processor 212, the second communication processor 214, or the integrated communication processor 260) may receive a message from the network 300 in operation 701. The electronic device 101 may identify the number of sections of transmission power configured by the network 300 (or the reception intensity measured by the network 300) on the basis of information included in the message in operation 703. For example, the network 300 may divide and manage the range of the reception intensity as illustrated in FIG. 8. Referring to FIG. 8, the network 300 may divide, for example, the minimum reception intensity (for example, 0 dB) and the maximum reception intensity (for example, 30 dB) into a plurality of sections (e.g., intervals) 801, 803, and 805. The minimum reception intensity (for example, 0 dB) and the maximum reception intensity (for example, 30 dB) may correspond to the minimum reception intensity and the maximum reception intensity which can be measured by the network 300, respectively, but there is no limitation. For example, the network 300 may calculate an average change ($\hat{R}$) of short-term fading in units of dB, but there is no limitation in a calculation scheme. The average change ($\hat{R}$) may be determined on the basis of, for example, the reception intensity measured by the PUCCH, but there is no limitation. The network 300 may identify δ (dB) which is a reliability index and configure the size of one interval to be greater than a sum $\hat{R}+δ$ of the average change and the reliability index. When the change of short-term fading is large or a movement speed of the electronic device 101 is fast, a relatively large reliability index may be configured if a channel variability is relatively large. When more division of reception intensity sections is required, a relatively small reliability index may be configured. The network 300 may configure the quotient of difference between the minimum reception intensity and the maximum reception intensity divided by the sum of the average change and the reliability index as the number of sections 801, 803, and 805. For example, in the embodiment of FIG. 8, 3 of the quotient of 30 dB corresponding to the difference between the minimum reception intensity and the maximum reception intensity divided by the sum of the average change and the reliability index may be configured as the number of sections 801, 803, and 805, and accordingly, threshold values 10 dB and 20 dB for dividing the sections may be determined. In another example, the network 300 may also determine ranges of a plurality of reception intensities on the basis of the reception intensity conventionally measured by the allocated PUCCH in response to the scheduling request message. For example, when the reception intensity conventionally measured by the allocated PUCCH in response to the scheduling request message is a first reception intensity, the network 300 may determine ranges of the plurality of reception intensities on the basis of the first reception intensity but there is no limitation in a scheme thereof. In an example, the network 300 may configure the first reception intensity as the maximum reception intensity and determine ranges of the plurality of reception intensities on the basis thereof. In another example, the network 300 may configure the first reception intensity as the minimum reception intensity and determine ranges of the plurality of reception intensities on the basis thereof. In another example, the network 300 may configure threshold values for dividing the ranges of the plurality of reception intensities using the first reception intensity (for example, perform calculations designated to the first reception intensity), but the above-described examples are only examples and there is no limitation in a scheme for configuring the ranges of the plurality of reception intensities using the first reception intensity.

According to various embodiments, the network 300 may transmit a message including the number of configured sections to the electronic device 101. In an example, the network 300 may transmit a radio resource control (RRC) message (for example, an RRC reconfiguration message) including an information element (IE) as shown in [Table 3] to the electronic device 101.

TABLE 3

```
SchedulingRequestConfig-v16 ::= SEQUENCE {
  sr-PUCCH-PowerLevel-r16           INTEGER (1..n)
OPTIONAL                            -- Need OR
}
```

One integer among 1 to n may be specified in an IE of sr-PUCCH-PowerLevel included in an IE of SchedulingRequestConfig, and the corresponding integer may be the number of sections divided by the network 300. The electronic device 101 may identify the integer specified in the IE of sr-PUCCH-PowerLevel included in the IE of SchedulingRequestConfig of the received RRC message and, accordingly, identify the number of sections of transmission power divided by the network 300 (or reception intensity measured by the network 300). The electronic device 101 may perform the power synchronization operation described with reference to FIG. 6 on the basis of the identified number of sections in operation 705. For example, when the number of sections is 3, the electronic device 101 may perform the power synchronization operation until 3 corresponding to the number of sizes of resources allocated by the network 300 is identified. For example, the electronic device 101 may identify the size of allocated resources on the basis of DCI received from the network 300 while changing transmission power of the RF signal corresponding to the scheduling request message. The electronic device 101 may repeat the performance of the change in transmission power of the RF signal corresponding to the scheduling request message and the performance of the identification of the size of resources allocated by the network 300 until different resource sizes corresponding to the number identified in the RRC message are identified.

Figure 9:
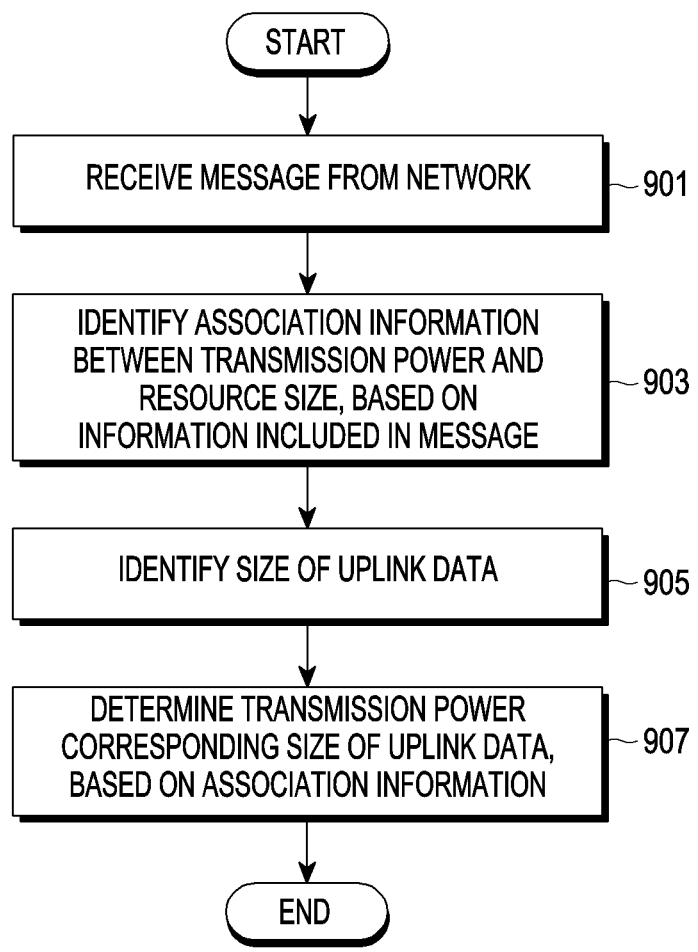
FIG. 9 is a flowchart illustrating an example method of operating an electronic device according to various embodiments.

FIG. 9 is a flowchart illustrating an example method of operating an electronic device according to various embodiments.

According to various embodiments, the electronic device 101 (for example, at least one of the processor 120, the first communication processor 212, the second communication processor 214, or the integrated communication processor 260) may receive a message from the network 300 in operation 901. The electronic device 101 may identify association information between the transmission power and the resource size on the basis of information included in the message in operation 903. For example, the electronic device 101 may identify association information between the resource size and transmission power control information as shown in [Table 4] on the basis of information included in the message received from the network 300.

TABLE 4

| Transmission power control information | Sizes of allocated resources (for example, $L_{CRBs}$) |
|---|---|
| −40% | First size |
| −20% | Second size |
| 0% | Third size |

The electronic device 101 may transmit an SR message to the network 300 after configuring, for example, PUCCH transmission power as 23 dBm. The network 300 may identify the reception intensity of the corresponding SR message. The network 300 may configure, for example, association information between transmission power control information and the allocated resource size as shown in [Table 4] on the basis of the identified reception intensity and transmit the same to the electronic device 101. The electronic device 101 may identify the size of uplink data in operation 905. The electronic device 101 may determine transmission power corresponding to the size of uplink data on the basis of, for example, the association information shown in [Table 4] in operation 907. For example, when allocation of resources having the third size is required on the basis of the size of uplink data, the electronic device 101 may perform control to apply the RF signal of 23 dBm controlled by 0% from right previously configured PUCCH transmission power 23 dBm. For example, when allocation of resources having the second size is required on the basis of the size of uplink data, the electronic device 101 may perform control to apply the RF signal of 18.4 dBm controlled by −20% from right previously configured PUCCH transmission power 23 dBm. For example, when allocation of resources having the first size is required on the basis of the size of uplink data, the electronic device 101 may perform control to apply the RF signal of 11.2 dBm controlled by −40% from right previously configured PUCCH transmission power 23 dBm.

Figure 10:
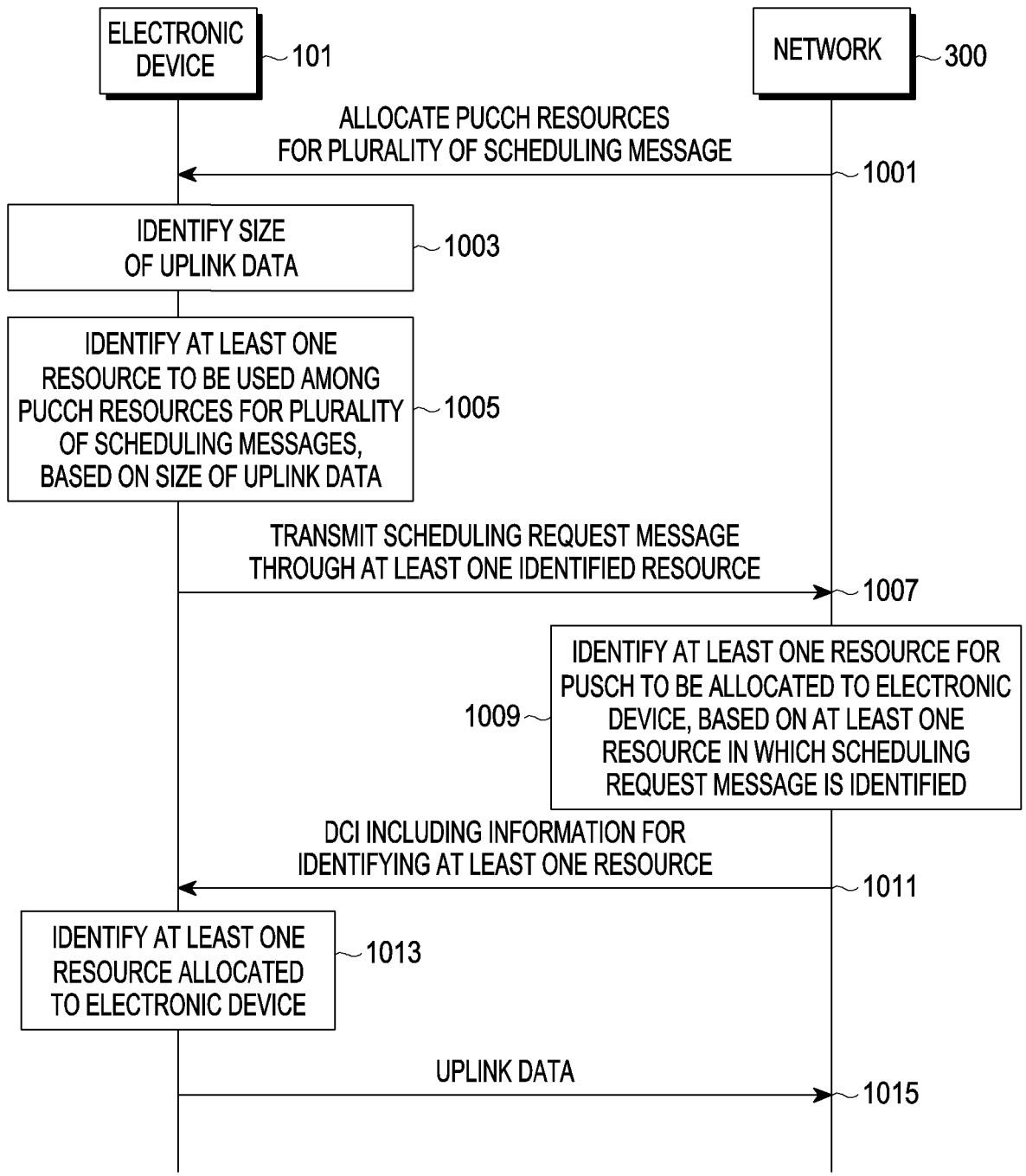
FIG. 10 is a signal flow diagram illustrating an example method of operating an electronic device and a network according to various embodiments.
Figure 11:
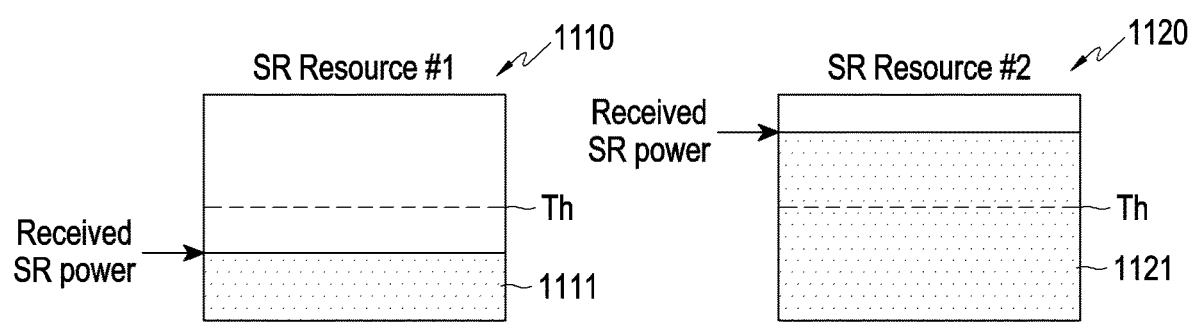
FIG. 11 is a diagram illustrating example resources allocated to a plurality of scheduling messages according to various embodiments.

FIG. 10 is a signal flow diagram illustrating an example method of operating an electronic device and a network according to various embodiments. The embodiment of FIG. 10 will be described with reference to FIG. 11. FIG. 11 is a diagram illustrating resources allocated to a plurality of scheduling messages according to various embodiments.

According to various embodiments, the network 300 may allocate PUCCH resources for a plurality of scheduling messages to the electronic device 101 in operation 1001. For example, the network 300 may transmit an RRC reconfiguration message to the electronic device 101, and an IE of sr-PUCCH-ResourceIndex may be included in an IE of SchedulingRequestConfig of the RRC reconfiguration message. The sr-PUCCH-ResourceIndex may include information on an index of the PUCCH resource allocated to the scheduling request message. For example, a plurality of sr-PUCCH-ResourceIndex may be configured. FIG. 11 illustrates PUCCH resources 1110 and 1120 allocated to a plurality of scheduling request messages according to various embodiments.

The electronic device 101 (for example, at least one of the processor 120, the first communication processor 212, the second communication processor 214, or the integrated communication processor 260) according to various embodiments may identify the size of uplink data in operation 1003. The electronic device 101 may identify at least one resource to be used among PUCCH resources (for example, 1110 and 1120 of FIG. 11) for the plurality of scheduling messages on the basis of the size of uplink data in operation 1005. For example, the electronic device 101 may use the PUCCH resources for the scheduling messages with binary codes. [Table 5] shows an example of association information between information on whether PUCCH resources for scheduling messages are used (for example, information on whether the scheduling messages are transmitted through the corresponding resources) and the size of allocated PUSCH resources according to various embodiments.

TABLE 5

| First resource 1110 | Second resource 1120 | Sizes of allocated PUSCH resources |
| --- | --- | --- |
| Used | Non-used | First size |
| Non-used | Used | Second size |
| Used | Used | Third size |

The association information shown in [Table 5] may be pre-stored by both the electronic device 101 and the network 300. In [Table 5], according to the use of resources allocated to two scheduling request messages, three PUSCH resource sizes (first size, second size, and third size) may be configured, but this is only an example and the number of resources allocated to the scheduling request messages is not limited. For example, when resources allocated to m scheduling request messages are used, $2^m-1$ PUSCH resource sizes may be configured. The electronic device 101 may identify that allocation of, for example, the PUSCH resource having the second size is required on the basis of the size of uplink data. The electronic device 101 may identify that the second resource 1120 should be used without using the first resource 1110 in order to allocate the PUSCH resource having the second size on the basis of the association information shown in [Table 5]. The electronic device 101 may transmit scheduling request messages through at least one identified resource in operation 1007. For example, the electronic device 101 may transmit scheduling request message through only the second resource 1120 among the plurality of resources 1110 and 1120.

According to various embodiments, the network 300 may identify at least one resource for the PUSCH to be allocated to the electronic device 101 on the basis of at least one resource in which the scheduling request messages are identified in operation 1009. For example, as illustrated in FIG. 11, a reception intensity 1111 less than a threshold value (Th) may be identified in the first resource 1110 among the plurality of resources 1110 and 1120 allocated for the scheduling request messages, and a reception intensity 1121 greater than or equal to the threshold value (Th) may be identified in the second resource 1120. The threshold value (Th) may be a value for determining whether the scheduling request message is received. The network 300 may determine the size of PUSCH resources to be allocated to the electronic device 101 as the second size according to the use of the second resource 1120 without the use of the first resource 1110 on the basis of, for example, the association information shown in [Table 5]. The network 300 may transmit DCI including information for identifying at least one resource to the electronic device 101 in operation 1011, and the DCI may include, for example, information for identifying the PUSCH having the second size. The electronic device 101 may identify at least one resource, for example, PUSCH resources allocated to the electronic device 101 on the basis of the received DCI in operation 1013. The electronic device 101 may transmit uplink data to the network 300 on the basis of at least one identified resource in operation 1015.

Figure 12:
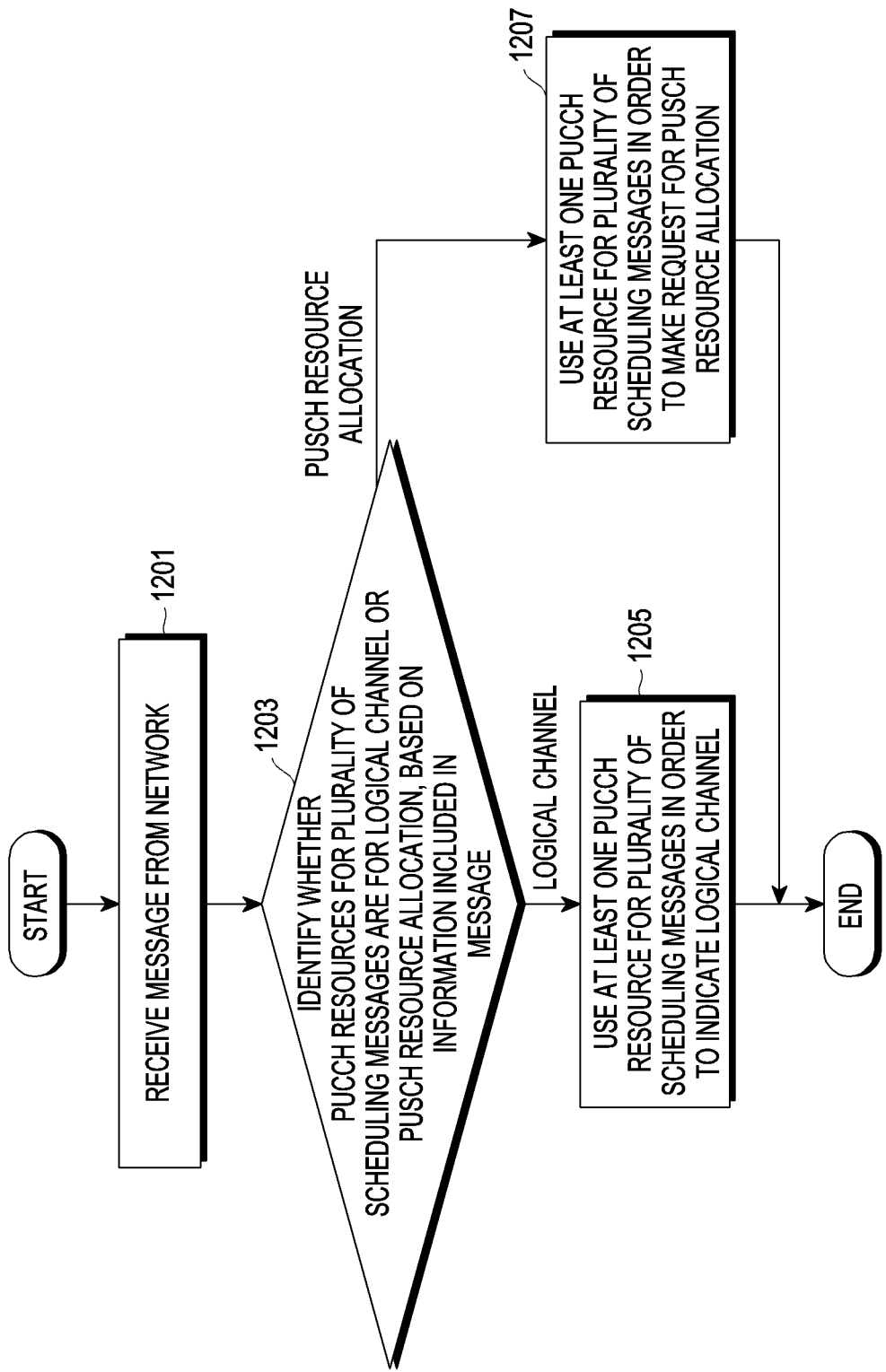
FIG. 12 is a flowchart illustrating an example method of operating an electronic device according to various embodiments.

FIG. 12 is a flowchart illustrating an example method of operating an electronic device according to various embodiments.

According to various embodiments, the electronic device 101 (for example, at least one of the processor 120, the first communication processor 212, the second communication processor 214, or the integrated communication processor 260) may receive a message (for example, the RRC reconfiguration message) from the network 300 in operation 1201. The electronic device 101 may identify whether PUCCH resources for the plurality of scheduling messages are for a logical channel or allocation of PUSCH resources on the basis of information included in the message in operation 1203. For example, [Table 6] shows an example of information included in the message from the network 300 according to various embodiments.

TABLE 6

```
SchedulingRequestConfig ::= SEQUENCE {
schedulingRequestToAddModList                    SEQUENCE    (SIZE
(1..maxNrofSR-ConfigPerCellGroup)) OF SchedulingRequestToAddMod
OPTIONAL, -- Need N
schedulingRequestToReleaseList                   SEQUENCE    (SIZE
(1..maxNrofSR-ConfigPerCellGroup)) OF SchedulingRequestId
OPTIONAL -- Need N
}
```

TABLE 6-continued

```
SchedulingRequestToAddMod ::= SEQUENCE {
schedulingRequestIdSchedulingRequestId,
sr-ProhibitTimer ENUMERATED {ms1, ms2, ms4, ms8, ms16, ms32, ms64, ms128}
OPTIONAL, -- Need S
sr-TransMax ENUMERATED { n4, n8, n16, n32, n64, spare3, spare2, spare1}
sr-Cause        ENUMERATED {logicalChannel, additionalSr}
}
```

For example, an IE of sr-Cause may be included in an IE of SchedulingRequestConfig, and a value of one of "logicalChannel" or "additionalSr" may be input. When it is determined to use the PUCCH resources for the scheduling request messages for the logical channel, the network 300 may input "logicalChannel" into the IE of sr-Cause within the RRC reconfiguration message. When it is determined to use the PUCCH resources for the scheduling request messages for allocation of PUSCH resources, the network 300 may input "additinoalSr" into the IE of sr-Cause within the RRC reconfiguration message. The electronic device 101 may identify whether the PUCCH resources for the scheduling request messages are used for the logical channel or allocation of the PUSCH resources on the basis of the value input into the IE of sr-Cause within the RRC reconfiguration message. Meanwhile, the IE of sr-Cause within the RRC reconfiguration message is only an example, and it will be understood by those skilled in the art that there is no limitation in a format and/or a message indicating whether the scheduling requests message are used for allocating the PUSCH resources by the network 300. When PUCCH resources for a plurality of scheduling messages are for the logical channel, the electronic device 101 may use at least one of the PUCCH resources for the plurality of scheduling messages in order to indicate the logical channel in operation 1205. When PUCCH resources for a plurality of scheduling messages are for allocation of PUSCH resources, the electronic device 101 may use at least one of the PUCCH resources for the plurality of scheduling messages in order to make a request for allocating the PUSCH resources in operation 1207. Since the use of PUCCH resources for making a request for allocating PUSCH resources has been described with reference to FIGS. 10 and 11, a detailed description thereof is not repeated here.

Figure 13:
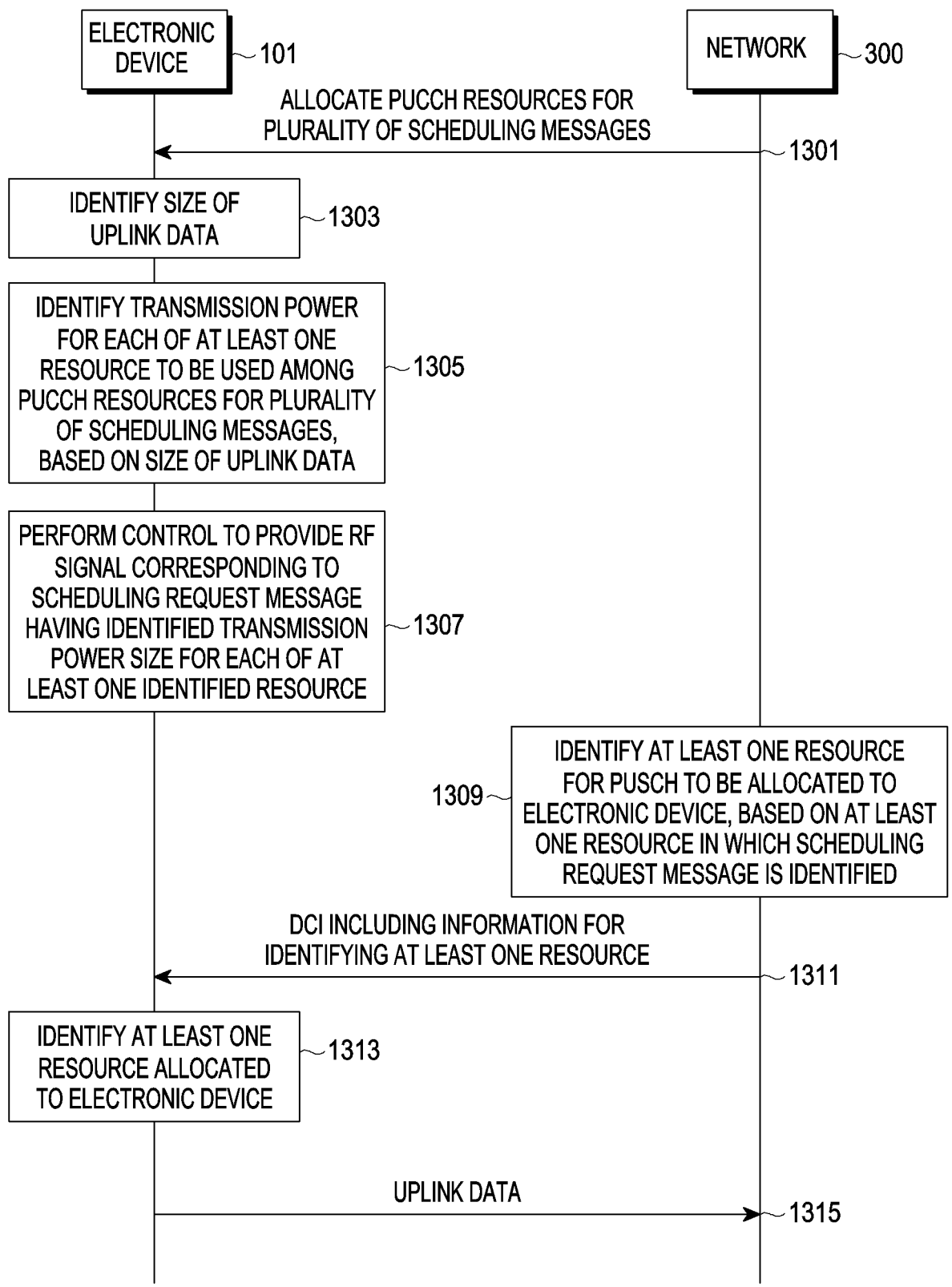
FIG. 13 is a signal flow diagram illustrating an example method of operating an electronic device and a network according to various embodiments.
Figure 14:
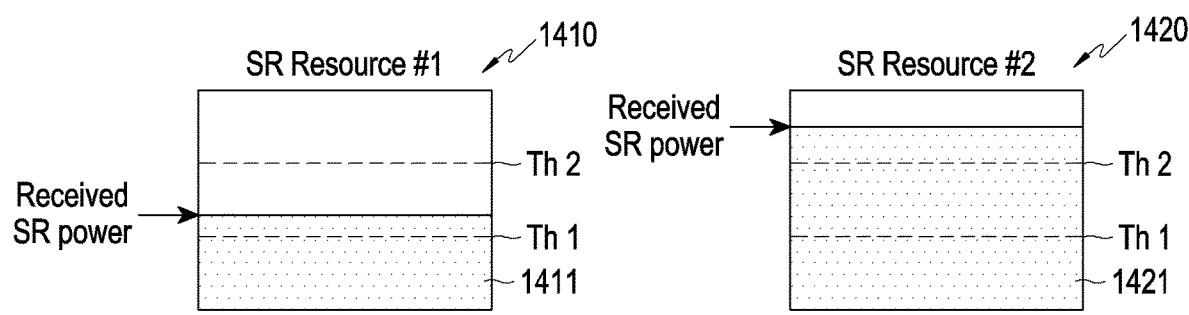
FIG. 14 is a diagram illustrating resources allocated to a plurality of scheduling messages according to various embodiments.

FIG. 13 is a signal flow diagram illustrating an example method of operating an electronic device and a network according to various embodiments. The embodiment of FIG. 13 is described with reference to FIG. 14. FIG. 14 is a diagram illustrating resources allocated to a plurality of scheduling messages according to various embodiments.

According to various embodiments, the network 300 may allocate PUCCH resources for a plurality of scheduling messages to the electronic device 101 in operation 1301. For example, the network 300 may transmit an RRC reconfiguration message to the electronic device 101, and an IE of sr-PUCCH-ResourceIndex may be included in an IE of SchedulingRequestConfig of the RRC reconfiguration message. FIG. 14 illustrates PUCCH resources 1410 and 1420 allocated to a plurality of scheduling request messages according to various embodiments.

The electronic device 101 (for example, at least one of the processor 120, the first communication processor 212, the second communication processor 214, or the integrated communication processor 260) according to various embodiments may identify the size of uplink data in operation 1303. The electronic device 101 may identify transmission power for each of at least one resource to be used among PUCCH resources (for example, 1410 and 1420 of FIG. 14) for a plurality of scheduling messages on the basis of the size of uplink data in operation 1305. For example, the electronic device 101 and the network 300 may predefine n states for one PUCCH resource for the scheduling messages. [Table 7] shows an example of association information between states in PUCCH resources for scheduling messages (for example, transmission power in the corresponding resources) managed by the electronic device 101 and sizes of allocated PUSCH resources according to various embodiments. [Table 8] shows an example of association information between states in PUCCH resources for scheduling messages (for example, reception in the corresponding resources) managed by the network 300 and sizes of PUSCH allocated resources according to various embodiments.

TABLE 7

| | Transmission power of first resource 1410 is less than first transmission power threshold value | Transmission power of first resource 1410 is greater than or equal to first transmission power threshold value and less than second transmission power threshold value | Transmission power of first resource 1410 is greater than or equal to second transmission power threshold value |
|---|---|---|---|
| Transmission power of second resource 1420 is less than first transmission power threshold value | No scheduling message | PUSCH resources having first size are allocated | PUSCH resources having second size are allocated |

TABLE 7-continued

| | | | |
|---|---|---|---|
| Transmission power of second resource 1420 is greater than or equal to first transmission power threshold value and less than second transmission power threshold value | PUSCH resources having third size are allocated | PUSCH resources having fourth size are allocated | PUSCH resources having fifth size are allocated |
| Transmission power of second resource 1420 is greater than or equal to second transmission power threshold value | PUSCH resources having sixth size are allocated | PUSCH resources having seventh size are allocated | PUSCH resources having eighth size are allocated |
| | Reception intensity of first resource 1410 is less than first reception intensity | Reception intensity of first resource 1410 is greater than or equal to first reception intensity and less than second reception intensity | Reception intensity of first resource 1410 is greater than or equal to second reception intensity |
| Reception intensity of second resource 1420 is less than first reception intensity | No scheduling message | PUSCH resources having first size are allocated | PUSCH resources having second size are allocated |
| Reception intensity of second resource 1420 is greater than or equal to first reception intensity and less than second reception intensity | PUSCH resources having third size are allocated | PUSCH resources having fourth size are allocated | PUSCH resources having fifth size are allocated |
| Reception intensity of second resource 1420 is greater than or equal to second reception intensity | PUSCH resources having sixth size are allocated | PUSCH resources having seventh size are allocated | PUSCH resources having eighth size are allocated |

Association information as shown in [Table 7] and/or [Table 8] may be pre-stored by the electronic device 101 and/or the network 300. For example, the electronic device 101 may acquire association information shown in [Table 7] on the basis of the performance of the power synchronization operation, but it is only an example and there is no limitation in a method of acquiring the association information shown in [Table 7] and/or [Table 8]. In [Table 7] and [Table 8], according to the use of resources allocated to two scheduling request messages, eight PUSCH resource sizes (first size to eighth size) may be configured, but this is only an example and the number of resources allocated to the scheduling request messages is not limited. For example, when n transmission power ranges or reception intensity ranges are configured for respective resources allocated to m scheduling request messages, $n^m-1$ PUSCH resource sizes may be configured. The electronic device 101 may identify that allocation of, for example, the PUSCH resource having the seventh size is required on the basis of the size of uplink data. In order to allocate PUSCH resources having the seventh size, the electronic device 101 may identify that transmission power of the first resource 1410 should be configured to be greater than or equal to the first transmission power threshold value and less than the second transmission power threshold value and that transmission power of the second resource 1420 should be configured to be greater than or equal to the second transmission power threshold value on the basis of the association information in [Table 7]. The electronic device 101 may control the RF signal corresponding to the scheduling request message having the identified size of transmission power according to each of at least one identified resource in operation 1307.

According to various embodiments, the network 300 may identify at least one resource for the PUSCH to be allocated to the electronic device 101 on the basis of the reception intensity in at least one resource in which the scheduling request message is identified in operation 1309. For example, as illustrated in FIG. 14, it may be identified that the reception intensity 1411 in the first resource 1410 is greater than or equal to a first reception intensity threshold value (Th1) and less than a second reception intensity threshold value (Th2) among the plurality of resources 1410 and 1420 allocated for the scheduling request messages and the reception intensity 1421 in the second resource 1420 is greater than or equal to the second reception intensity threshold value (Th2). The network 300 may determine the size of PUSCH resources corresponding to a range including reception intensities identified in the resources 1410 and 1420 as the seventh seize on the basis of, for example, the association information in [Table 8]. The network 300 may transmit DCI including information for identifying at least one resource to the electronic device 101 in operation 1311, and the DCI may include, for example, information for identifying the PUSCH having the seventh size. The electronic device 101 may identify at least one resource, for example, PUSCH resources allocated to the electronic device 101 on the basis of the received DCI in operation 1313. The electronic device 101 may transmit uplink data to the network 300 on the basis of at least one identified resource in operation 1315.

According to various example embodiments, a method of operating a network (for example, the network 300) may include: identifying a scheduling request message from an electronic device (for example, the electronic device 101) through at least one first resource, and the at least one first resource may include at least a portion of physical uplink control channel (PUCCH) resources allocated to the electronic device; identifying a reception intensity of the scheduling request message in the at least one first resource; identifying at least one second resource allocated to the electronic device, based on the reception intensity, wherein the at least one second resource may be allocated for a physical uplink shared channel (PUSCH) of the electronic device; and transmitting downlink control information (DCI) including information for identifying the at least one second resource to the electronic device.

According to various example embodiments, the identifying the at least one second resource allocated to the electronic device, based on the reception intensity may include: identifying a first reception intensity range including the reception intensity among a plurality of reception intensity ranges based on association information between the plurality of reception intensity ranges stored in the network and a plurality of resource sizes, identifying a first resource size corresponding to the first reception intensity range based on the association information, and identifying the at least one second resource having the first resource size.

According to various example embodiments, the plurality of reception intensity ranges may include ranges divided between a minimum reception intensity that can be measured by the network and a maximum reception intensity that can be measured by the network.

According to various example embodiments, the plurality of reception intensity ranges may be based on a reception intensity of another scheduling request message received from the electronic device through the at least one first resource before the scheduling request message is received.

According to various example embodiments, the method of operating the network may further include: transmitting a message including information on a number of plurality of reception intensity ranges to the electronic device.

According to various example embodiments, the at least one first resource includes a plurality of PUCCH resources, and the identifying the at least one second resource allocated to the electronic device based on the reception intensity may include: identifying reception intensities measured in the plurality of respective PUCCH resources, identifying a second resource size corresponding to the reception intensities measured in the plurality of respective PUCCH resources, and identifying the at least one second resource having the second resource size.

According to various example embodiments, a method of operating a network (for example, the network 300) may include: identifying reception of a scheduling request message from an electronic device (for example, the electronic device 101) in at least a portion of physical uplink control channel (PUCCH) resources for the scheduling request message, allocating physical uplink shared channel (PUSCH) resources having a first size to the electronic device based on identification of the scheduling request message in a first set of the PUCCH resources, allocating PUSCH resources having a second size different from the first size to the electronic device based on identification of the scheduling request message in a second set of the PUCCH resources different from the first set.

According to various example embodiments, the allocating the PUSCH resources having the first size to the electronic device based on the identification of the scheduling request message in the first set of the PUCCH resources may include: allocating the PUSCH resources having the first size to the electronic device based on identification that the scheduling request message has a first reception size in the first set of the PUCCH resources.

According to various example embodiments, the method of operating the network may further include: allocating PUSCH resources having a third size different from the first size to the electronic device based on identification that the scheduling request message has a second reception size different from the first reception size in the first set of the PUCCH resources.

According to various example embodiments, a method of operating a network (for example, the network 300) may include: identifying a scheduling request message from an electronic device (for example, the electronic device 101) through at least one first resource, and the at least one first resource may include at least a portion of physical uplink control channel (PUCCH) resources allocated to the electronic device; identifying a reception intensity of the scheduling request message in the at least one first resource; and transmitting downlink control information (DCI) including information for identifying at least one second resource allocated to the electronic device to the electronic device based on the reception intensity satisfying a specified condition, and the at least one second resource may be allocated for a physical uplink shared channel (PUSCH) of the electronic device. The method of operating the network may include: transmitting DCI including information for identifying at least one third resource allocated to the electronic device having a size greater than the size of the at least one second resource to the electronic device based on the reception intensity dissatisfying the specified condition, and the at least one third resource may be allocated for the PUSCH of the electronic device.

According to various example embodiments, the method of operating the network may further include: determining whether the reception intensity is greater than or equal to a threshold reception intensity to determine whether the condition is satisfied.

According to various example embodiments, an electronic device (for example, the electronic device 101) may include: at least one antenna (for example, at least one of the first antenna module 242, the second antenna module 244, or the third antenna module 246), a radio frequency (RF) circuit (for example, at least one of the first RFIC 222, the second RFIC 224, the third RFIC 226, the fourth RFIC 228, the first RFFE 232, the second RFFE 234, or the third RFFE 236) configured to provide RF signals to the at least one antenna, and at least one processor (for example, at least one of the processor 120, the first communication processor 212, the second communication processor 214, or the integrated communication processor 260), the at least one processor configured to: identify a size of uplink data which should be transmitted to a network, control the RF circuit to provide a first RF signal of first transmission power based on the size of uplink data being greater than or equal to a threshold size, the first RF signal corresponding to a scheduling request message causing allocation of physical uplink shared channel (PUSCH) resources having a first resource size to the electronic device, and control the RF circuit to provide a second RF signal of second transmission power different from the first transmission power based on the size of uplink data being less than the threshold size, the second RF signal corresponding to a scheduling request message causing allocation of PUSCH resources having a second resource size different from the first resource size to the electronic device.

According to various example embodiments, the at least one processor may be further configured to: identify association information between at least one transmission power and PUSCH resource sizes based on a power synchronization operation including transmission of at least one other scheduling request message corresponding to the at least one transmission power before the scheduling request message is transmitted and identification of the sizes of allocated PUSCH resources based on at least one other scheduling request message.

According to various example embodiments, the at least one processor may be configured to: identify the first transmission power associated with the PUCSH resource size greater than or equal to the threshold size based on the association information, as at least a portion of controlling the RF circuit to provide the first RC signal of the first transmission power based on the size of uplink data being greater than or equal to the threshold size, and identify the second transmission power associated with the PUSCH resource size less than the threshold size based on the association information, as at least a portion of an operation of controlling the RF circuit to provide the second RF signal of the second transmission power based on the size of uplink data being less than the threshold size.

According to various example embodiments, the at least one processor may be further configured to: receive information on a number of sizes of PUSCH resources allocated by the network from the network, and identify the association information by performing the power synchronization operation until the sizes of the PUSCH resources corresponding to the number are identified, as at least a portion of identifying the association information between the at least one transmission power and the PUSCH resource sizes.

According to various example embodiments, the at least one processor may be further configured to: identify association information between at least one transmission power control levels and PUSCH resource sizes from the network before the scheduling request message is transmitted.

According to various example embodiments, the at least one processor may be configured to: identify the first transmission power using a control level associated with the PUCSH resource size greater than or equal to the threshold size based on the association information, as at least a portion of controlling the RF circuit to provide the first RF signal of the first transmission power based on the size of uplink data being greater than or equal to the threshold size, and identify the second transmission power using a control level associated with the PUSCH resource size less than the threshold size based on the association information as at least a portion of controlling the RF circuit to provide the second RF signal of the second transmission power based on the size of uplink data being less than the threshold size.

According to various example embodiments, an electronic device (for example, the electronic device 101) may include: at least one antenna (for example, at least one of the first antenna module 242, the second antenna module 244, or the third antenna module 246), a radio frequency (RF) circuit (for example, at least one of the first RFIC 222, the second RFIC 224, the third RFIC 226, the fourth RFIC 228, the first RFFE 232, the second RFFE 234, or the third RFFE 236) configured to provide RF signals to the at least one antenna, and at least one processor (for example, at least one of the processor 120, the first communication processor 212, the second communication processor 214, or the integrated communication processor 260), the at least one processor configured to: identify a size of uplink data which should be transmitted to a network, control the RF circuit to provide a first RF signal using a first set of a plurality of physical uplink control channel (PUCCH) resources based on the size of uplink data corresponding to a first size, the first RF signal corresponding to a scheduling request message causing allocation of physical uplink shared channel (PUSCH) resources having a first resource size to the electronic device, and control the RF circuit to provide a second RF signal using a second set of the plurality of PUCCH resources different form the first set based on the size of uplink data corresponding to a second size different from the first size, the second RF signal corresponding to a scheduling request message causing allocation of PUSCH resources having a second resource size different from the first resource size to the electronic device.

According to various example embodiments, the at least one processor may be configured to: control the RF circuit to provide the first RF signal having a first intensity using at least one PUCCH resource included in the first set in controlling the RF circuit to provide the first RF signal using the first set of the plurality of PUCCH resources, based on the size of uplink data corresponding to the first size.

According to various example embodiments, the at least one processor may be further configured to: control the RF circuit to provide a third RF signal having a second intensity using at least one PUCCH resource included in the first set, based on the size of uplink data corresponding to a third size, and the third RF signal may correspond to a scheduling request message causing allocation of PUSCH resources having a third resource size to the electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method of operating base station, the method comprising:
    identifying a scheduling request message from an electronic device through at least one first resource, the at least one first resource including at least a portion of physical uplink control channel (PUCCH) resources allocated to the electronic device;
    identifying a reception intensity of the scheduling request message in the at least one first resource;
    identifying at least one second resource allocated to the electronic device based on the reception intensity of the scheduling request message in the at least one first resource, the at least one second resource being allocated for a physical uplink shared channel (PUSCH) of the electronic device, wherein a resource size of the at least one second resource is based on the reception intensity; and
    transmitting downlink control information (DCI) including information for identifying the at least one second resource to the electronic device.

2. The method of claim 1, wherein the identifying of the at least one second resource allocated to the electronic device based on the reception intensity, comprises:
    identifying a first reception intensity range including the reception intensity among a plurality of reception intensity ranges, based on association information between the plurality of reception intensity ranges stored in the base station and a plurality of resource sizes;
    identify a first resource size corresponding to the first reception intensity range, based on the association information; and
    identifying the at least one second resource having the first resource size.

3. The method of claim 2, wherein the plurality of reception intensity ranges include ranges divided between a minimum reception intensity that can be measured by the base station and a maximum reception intensity that can be measured by the base station.

4. The method of claim 2, wherein the plurality of reception intensity ranges are based on a reception intensity of another scheduling request message received from the electronic device through the at least one first resource before the scheduling request message is received.

5. The method of claim 2, further comprising transmitting a message including information about a number of a plurality of reception intensity ranges to the electronic device.

6. The method of claim 1, wherein the at least one first resource includes a plurality of PUCCH resources, and
    the identifying of the at least one second resource allocated to the electronic device based on the reception intensity, comprises:
    identifying reception intensities measured in the plurality of respective PUCCH resources;
    identifying a second resource size corresponding to the reception intensities measured in the plurality of respective PUCCH resources; and
    identifying the at least one second resource having the second resource size.

7. A method of operating a base station, the method comprising:
    identifying reception of a scheduling request message from an electronic device in at least a portion of physical uplink control channel (PUCCH) resources for the scheduling request message;
allocating physical uplink shared channel (PUSCH) resources having a first size to the electronic device based on identification of the scheduling request message in a first set of the PUCCH resources, wherein the first size is based on a size of the scheduling request message in the first set of the PUCCH resources; and
allocating PUSCH resources having a second size different from the first size to the electronic device based on identification of the scheduling request message in a second set of the PUCCH resources different from the first set.

8. The method of claim 7, wherein the allocating of the PUSCH resources having the first size to the electronic device based on the identification of the scheduling request message in the first set of the PUCCH resources, comprises: allocating the PUSCH resources having the first size to the electronic device based on identifying that the scheduling request message has a first reception size in the first set of the PUCCH resources.

9. The method of claim 8, further comprising: allocating PUSCH resources having a third size different from the first size to the electronic device based on identification that the scheduling request message has a second reception size different from the first reception size in the first set of the PUCCH resources.

10. A method of operating a base station, the method comprising:
identifying a scheduling request message from an electronic device through at least one first resource, the at least one first resource being at least a portion of physical control channel (PUCCH) resources allocated to the electronic device;
identifying a reception intensity of the scheduling request message in the at least one first resource;
transmitting downlink control information (DCI) including information for identifying at least one second resource allocated to the electronic device to the electronic device based on the reception intensity of the scheduling request message in the at least one first resource satisfying a specified condition, the at least one second resource being allocated for a PUSCH of the electronic device, wherein a resource size of the at least one second resource is based on the reception intensity; and
transmitting DCI including information for identifying at least one third resource allocated to the electronic device having a size greater than the size of the at least one second resource to the electronic device based on the reception intensity not satisfying the specified condition, the at least one third resource being allocated for the PUSCH of the electronic device.

11. The method of claim 10, further comprising: determining whether the reception intensity is greater than or equal to a threshold reception intensity to determine whether the condition is satisfied.

12. An electronic device comprising:
at least one antenna;
a radio frequency (RF) circuit configured to provide RF signals to the at least one antenna; and (
at least one processor,
memory storing instructions, that when executed by the at least one processor individually or collectively, cause the electronic device to:
identify a size of uplink data to be transmitted to a base station,
transmit, through the RF circuit, a first RF signal of first transmission power, based on the size of uplink data being greater than or equal to a threshold size, the first RF signal corresponding to a scheduling request message causing allocation of physical uplink shared channel (PUSCH) resources having a first resource size to the electronic device, and
transmit, through the RF circuit, a second RF signal of second transmission power different from the first transmission power, based on the size of uplink data being less than the threshold size, the second RF signal corresponding to a scheduling request message causing allocation of PUSCH resources having a second resource size different from the first resource size to the electronic device.

13. The electronic device of claim 12, wherein the instructions, when executed by the at least one processor individually or collectively, cause the electronic device to: identify association information between at least one transmission power and PUSCH resource sizes, based on a power synchronization operation including transmission of at least one other scheduling request message corresponding to the at least one transmission power before the scheduling request message is transmitted and identification of the sizes of allocated PUSCH resources based on at least one other scheduling request message.

14. The electronic device of claim 13, wherein the instructions, when executed by the at least one processor individually or collectively, cause the electronic device to: identify the first transmission power associated with the PUCSH resource size greater than or equal to the threshold size, based on the association information, as at least a portion of controlling the RF circuit to provide the first RF signal of the first transmission power, based on the size of uplink data being greater than or equal to the threshold size, and
identify the second transmission power associated with the PUSCH resource size less than the threshold size, based on the association information, as at least a portion of controlling the RF circuit to provide the second RF signal of the second transmission power, based on the size of uplink data being less than the threshold size.

15. The electronic device of claim 13, wherein the instructions, when executed by the at least one processor individually or collectively, cause the electronic device to: receive information about a number of sizes of PUSCH resources allocated by the base station from the base station, and
identify the association information by performing the power synchronization operation until the sizes of the PUSCH resources corresponding to the number are identified, as at least a portion of identifying the association information between the at least one transmission power and the PUSCH resource sizes.

16. The electronic device of claim 12, wherein the instructions, when executed by the at least one processor individually or collectively, cause the electronic device to: identify association information between at least one transmission power control levels and PUSCH resource sizes from the base station before the scheduling request message is transmitted.

17. The electronic device of claim 16, wherein the instructions, when executed by the at least one processor individually or collectively, cause the electronic device to: identify the first transmission power using a control level associated with the PUCSH resource size greater than or equal to the threshold size, based on the association information, as at least a portion of controlling the RF circuit to provide the first RF signal of the first transmission power, based on the size of uplink data being greater than or equal to the threshold size, and identify the second transmission power using a control level associated with the PUSCH resource size less than the threshold size, based on the association information, as at least a portion of controlling the RF circuit to provide the second RF signal of the second transmission power, based on the size of uplink data being less than the threshold size.

18. An electronic device comprising:

at least one antenna;

a radio frequency (RF) circuit configured to provide RF signals to the at least one antenna; and at least one processor, memory storing instructions, that when executed by the at least one processor individually or collectively, cause the electronic device to:

identify a size of uplink data to be transmitted to a base station, transmit, through the RF circuit, a first RF signal using a first set of a plurality of physical uplink control channel (PUCCH) resources, based on the size of uplink data corresponding to a first size, the first RF signal corresponding to a scheduling request message causing allocation of physical uplink shared channel (PUSCH) resources having a first resource size to the electronic device, and transmit, through the RF circuit, a second RF signal using a second set of the plurality of PUCCH resources different form the first set, based on the size of uplink data corresponding to a second size different from the first size, the second RF signal corresponding to a scheduling request message causing allocation of PUSCH resources having a second resource size different from the first resource size to the electronic device.

19. The electronic device of claim 18, wherein the instructions, when executed by the at least one processor individually or collectively, cause the electronic device to: control the RF circuit to provide the first RF signal having a first intensity using at least one PUCCH resource included in the first set in controlling the RF circuit to provide the first RF signal using the first set of the plurality of PUCCH resources, based on the size of uplink data corresponding to the first size.

20. The electronic device of claim 18, wherein the instructions, when executed by the at least one processor individually or collectively, cause the electronic device to: control the RF circuit to provide a third RF signal having a second intensity using at least one PUCCH resource included in the first set, based on the size of uplink data corresponding to a third size, wherein the third RF signal corresponds to a scheduling request message causing allocation of PUSCH resources having a third resource size to the electronic device.

* * * * *